United States Patent
Kroon

(10) Patent No.: US 9,463,638 B1
(45) Date of Patent: Oct. 11, 2016

(54) SYSTEM AND METHOD FOR INOPERATIVE INKJET COMPENSATION

(71) Applicant: Xerox Corporation, Norwalk, CT (US)

(72) Inventor: Stephen M. Kroon, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 3 days.

(21) Appl. No.: 14/729,286

(22) Filed: Jun. 3, 2015

(51) Int. Cl.
- *B41J 2/21* (2006.01)
- *B41J 2/045* (2006.01)
- *H04N 1/405* (2006.01)

(52) U.S. Cl.
CPC ............ *B41J 2/2103* (2013.01); *B41J 2/0451* (2013.01); *B41J 2/2132* (2013.01); *B41J 2/04596* (2013.01); *B41J 2/2142* (2013.01); *H04N 1/40018* (2013.01); *H04N 1/4051* (2013.01); *H04N 1/4053* (2013.01)

(58) Field of Classification Search
None
See application file for complete search history.

(56) References Cited

U.S. PATENT DOCUMENTS

| | | | |
|---|---|---|---|
| 8,042,899 B2 | 10/2011 | Folkins et al. | |
| 8,376,503 B1 | 2/2013 | Wu et al. | |
| 8,387,819 B2 | 3/2013 | Chu et al. | |
| 8,531,743 B2 | 9/2013 | Wu et al. | |
| 2012/0075370 A1* | 3/2012 | Ramakrishnan | B41J 2/04508 347/10 |
| 2013/0265352 A1 | 10/2013 | Burress et al. | |
| 2014/0035981 A1 | 2/2014 | Burress et al. | |

\* cited by examiner

*Primary Examiner* — Lisa M Solomon
(74) *Attorney, Agent, or Firm* — Maginot Moore & Beck LLP

(57) ABSTRACT

A method for operating an imaging device identifies inoperative inkjets in an imaging device and modifies non-image data values in response to the identification of the inoperative inkjets. The method halftones image data for forming an image by generating halftoned image data with reference to modified non-image data values to compensate for identified inoperative inkjets. The method operates inkjets using the generated halftoned image data to form the image. The non-image data values modified in response to identified inoperative inkjets and later referenced while halftoning may include halftone threshold array, per-output raster column "RasterType" or TRC data values.

16 Claims, 24 Drawing Sheets

SYSTEM AND METHOD FOR INOPERATIVE INKJET COMPENSATION

TECHNICAL FIELD

The present disclosure relates generally to digital imaging systems, and more particularly, to inkjet imaging systems that compensate for missing ink to be ejected by inoperative inkjets.

BACKGROUND

Drop on demand inkjet technology for producing printed media has been employed in commercial products such as printers, plotters, and facsimile machines. Generally, an inkjet image is formed by selectively ejecting ink drops onto an image substrate from a plurality of drop generators or inkjets, which are arranged in a printhead or a printhead assembly. For example, the printhead assembly and the image substrate are moved relative to one another and the inkjets are controlled to eject ink drops at appropriate times. The timing of the inkjet activation is performed by a printhead controller, which generates firing signals that selectively activate inkjets to eject ink onto an image substrate. The image substrate may be an intermediate image member, such as a print drum or belt, from which the ink image is later transferred to a print medium, such as paper. The image substrate may also be a moving web of print medium or sheets of a print medium onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form and delivered to a melting device, which heats the solid ink to its melting temperature to generate liquid ink, which is supplied to a printhead.

During the operational life of an inkjet printer, inkjets in one or more of the printheads may become unable to eject ink reliably or accurately in response to receiving a firing signal. These inoperative inkjets may become operational after one or more image printing cycles. In other cases, the inkjet may remain unable to eject ink reliably or accurately until a purge cycle is performed. A purge cycle may successfully unclog inkjets so that they are able to eject ink once again. Execution of a purge cycle, however, requires the imaging apparatus to be taken out of its image generating mode. Thus, purge cycles affect the throughput rate of an imaging apparatus and are preferably performed during downtime. Inkjets that cannot reliably or accurately eject ink in response to a firing signal or that eject a smaller amount of ink than the firing signal would obtain from an operational inkjet are denoted as inoperative inkjets in this document.

Missing inkjet compensation (MJC) methods have been developed that enable an imaging apparatus to generate images even though one or more inkjets in the imaging apparatus are unable to eject ink. These compensation methods operate on the output of image halftoning processes to modify the halftoned data used to generate firing signals for inkjets in a printhead. As used in this document, "halftoning" refers to the processes performed by a marking engine on image data values to generate output image values. These output image values are used to generate firing signals, which cause the inkjets of a printhead to eject ink onto the recording media. Once the output image values are generated, a compensation method may use information regarding inoperative inkjets detected in a printhead to identify the output image data values that correspond to one or more inoperative inkjets in the printhead. The marking engine then uses a compensation method to find a neighboring or nearby output image data value that can be adjusted to compensate for the inoperative inkjet. Preferably, an increase in the amount of ink ejected near the inoperative inkjet may be achieved by replacing a zero output image value with the output image value that corresponds to the inoperative inkjet. Thus, the marking engines generate halftoned data for all of the inkjets in each printhead since the engines operate with the assumption that all inkjets in the printhead are operable. Only after the halftoned data is generated do the MJC methods distinguish between halftoned data corresponding to inoperative inkjets and halftoned data corresponding to operative inkjets. To process all of the halftoned data appropriately, some previously known printers implement MJC methods in hardware, such as in an ASIC, FPGA, or the like, to handle the amount of halftoned data produced. Other previously known printers, however, cannot be configured with the hardware required for implementing MJC methods. Instead, these printers perform the MJC method using only software executed by one or more processors in the printer. The time necessary for the computations can adversely impact the throughput of these printers. Faster and more efficient MJC methods would be beneficial.

SUMMARY

A new method compensates for inoperative inkjets in an inkjet printer by modifying non-image data prior to the performance of the halftoning process. The method includes identifying inoperative inkjets in the imaging device, modifying non-image data with reference to the identified inoperative inkjets, receiving continuous tone image data for forming an image with the imaging device, applying the modified non-image data to the received continuous tone image data to produce image data that compensates for the identified inoperative inkjets in the imaging device, and operating inkjets within the imaging device with reference to the image data that compensates for the identified inoperative inkjets.

An imaging device incorporates the method that compensates for inoperative inkjets by modifying non-image data prior to the performance of the halftoning process. The imaging device includes a memory in which continuous tone image data for forming an image on media are stored, and a controller operatively connected to the memory and a plurality inkjets configured to form an image with marking material. The controller is configured to identify inoperative inkjets in the imaging device, modify non-image data with reference to the identified inoperative inkjets, apply the modified non-image data to the continuous tone image data to produce image data that compensates for the identified inoperative inkjets in the imaging device, and operate inkjets within the imaging device with reference to the image data that compensates for the identified inoperative inkjets.

BRIEF DESCRIPTION OF THE DRAWINGS

The foregoing aspects and other features of an inkjet printer that compensates for inoperative inkjets with modification of non-image data prior to halftoning are explained in the following description, taken in connection with the accompanying drawings. Generally FIGS. 1A, 1B, 2, 3A, 3B, 6, 7, 8, 9, 10, and 11 illustrate embodiments of the method applied through conventional scalar threshold array point-process halftoning using a threshold array modified to compensate for output density lost in the vicinity of missing rasters due to inoperative inkjets. FIGS. 12A, 12B, 13A, 13B, 14A, 14B, 14C, 15, 16, 17, and 18 illustrate embodiments applied through vector threshold array point-process halftoning using TRC values to achieve the same goal.

FIG. 1A is a flow diagram of an exemplary embodiment to compensate for inoperative inkjets utilizing modified threshold array halftoning.

FIG. 1B illustrates a second exemplary embodiment to compensate for inoperative inkjets similar to the embodiment of FIG. 1A with the addition of a simplified post-halftoning MJC process.

FIG. 2 illustrates an exemplary N-column by M-row threshold matrix identifying columns that can be modified to correct for a single malfunctioning inkjet.

FIG. 3A illustrates three threshold column tone level bias curves, one unbiased or before identity curve labeled "Unmodified" and two biased or after curves labeled "Unmodified," "Missing," and "Neighbor" representing per-column density adjustments. These values are composed with threshold matrix column values to hide missing rasters.

FIG. 3B illustrates three threshold column tone level bias curves similar to FIG. 3A, one unbiased or before identity curve labeled "Unmodified" and two biased or after curves labeled "Unmodified," "Missing," and "Neighbor" representing per-column density adjustments to compose with threshold column values to hide missing rasters. These curves differ from those in FIG. 3A as they are designed to take advantage of subsequently applied simple binary domain missing jet compensation (MJC) processing with the assumption that post-halftoning MJC is also applied to the halftoned image. Accordingly, these curves do not eliminate all threshold values below the maximum correctable level from the missing raster columns but adjust them to substantially reduced levels so that simplified binary domain MJC successfully repositions any residual marked pixels representing input levels below maximum correctable density.

FIG. 4 illustrates a graph of an exemplary unmodified (default) ink contribution over 10 adjacent rasters. For simplicity, contributions from all rasters are the same.

FIG. 5 illustrates a graph of an exemplary modified ink contribution over a 10-raster swath with one raster m missing. The contribution is modified relative to the unmodified ink contribution of FIG. 4. FIG. 5 depicts ink contribution after modification by exemplary embodiments described herein. Output density contribution from non-missing rasters n1 to n9 are increased to compensate for missing raster m causing n1 to n9 to saturate early, reaching 100% output at about 90% of the input level. The missing raster m does not provide ink below the maximum correctable level. From around 90% to 100% of the input level, however, the missing raster m provides all or almost all additional ink required to increase density in the ten-raster swath to 100%. This contribution allows non-missing rasters to be modified as missing and still provide acceptable results up to 100% input level.

FIG. 6 illustrates an exemplary exposure plot of unmodified threshold values.

Figure 6:
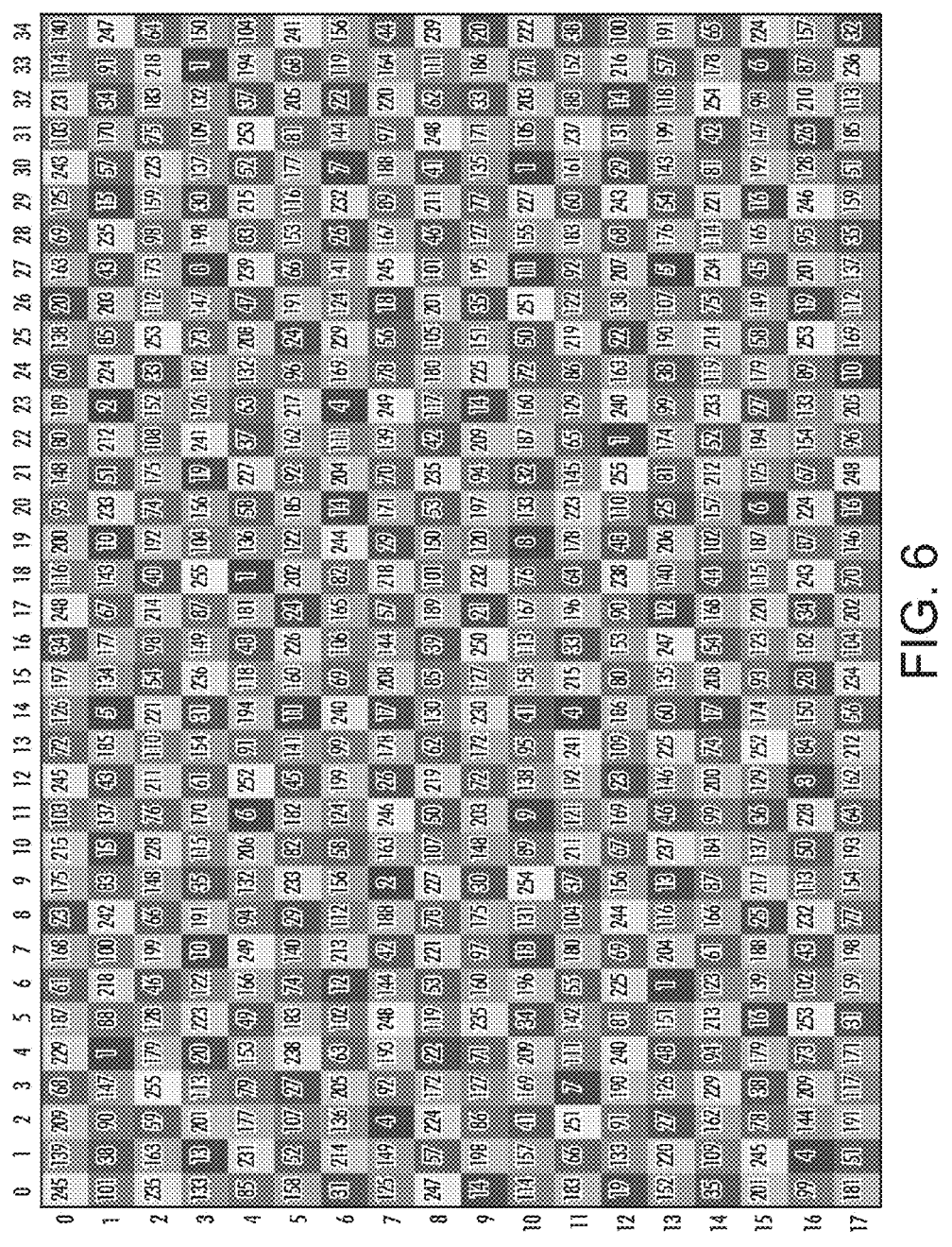
Figure 7:
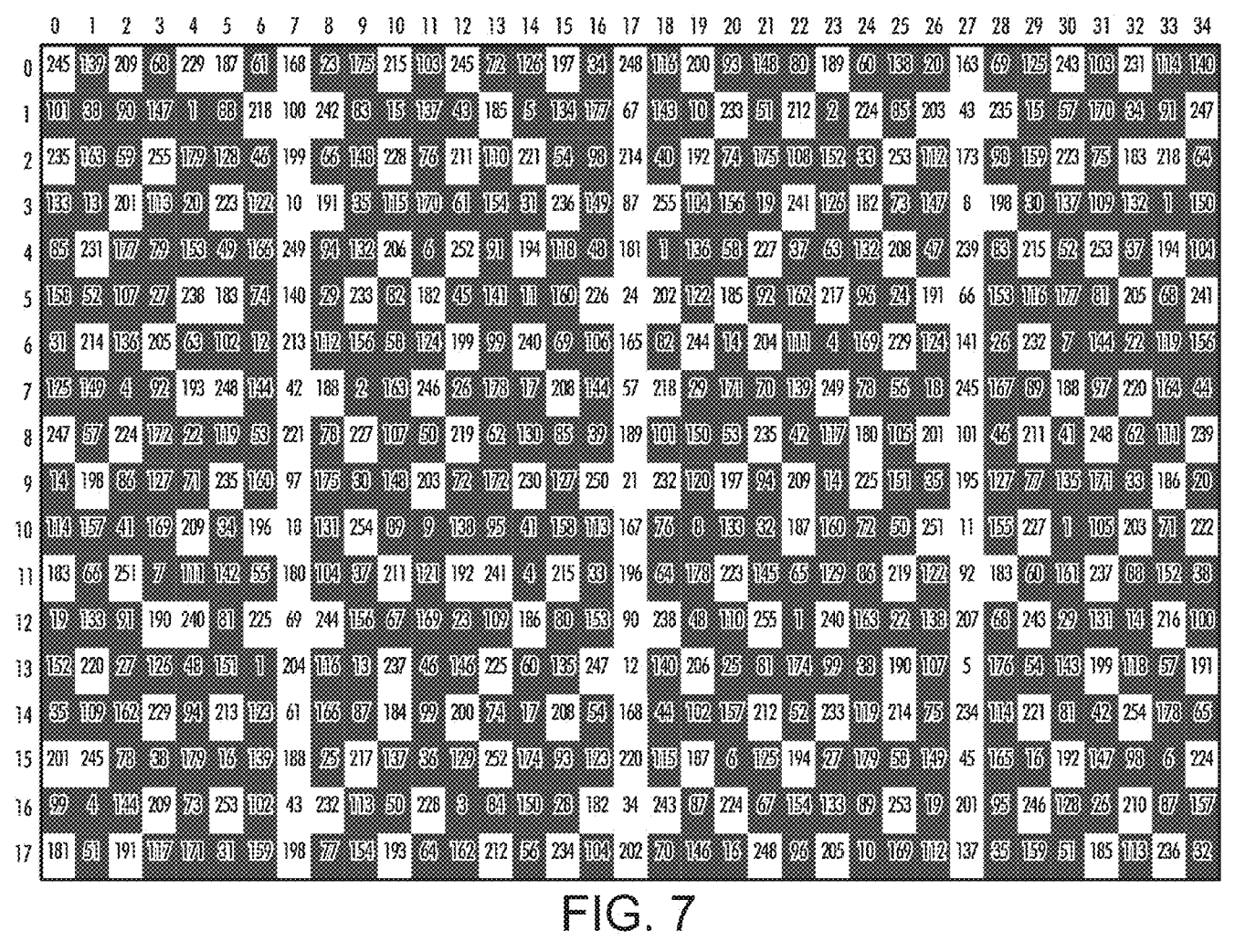

Cell shading in FIG. 7 illustrates an exemplary binary result of halftoning a uniform 70% gray image using threshold values from FIG. 6 with raster columns 7, 17, and 27 unmarked to represent missing columns. Threshold values used are superimposed at each pixel location in the diagram.

Figure 8:
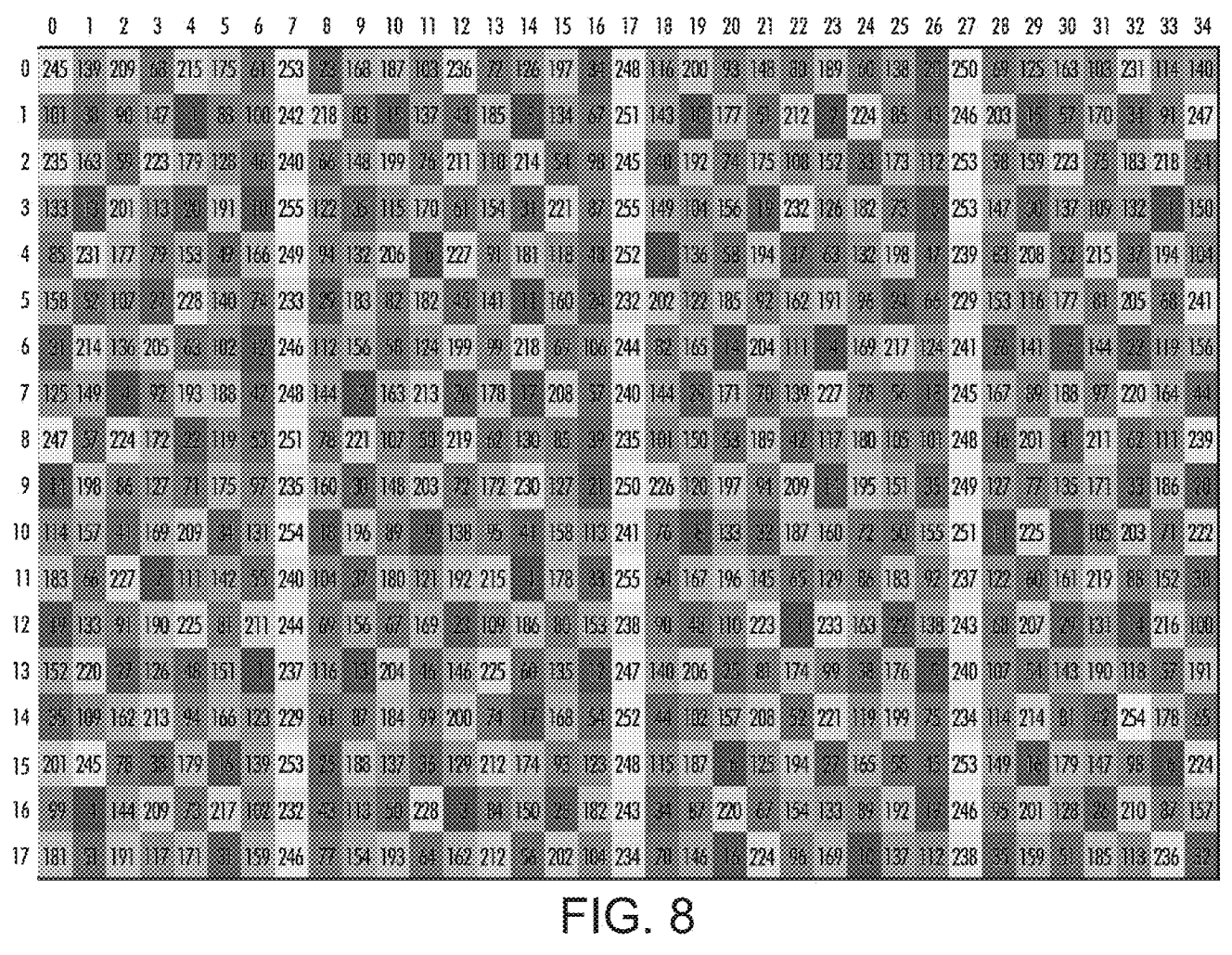

FIG. 8 illustrates an exemplary exposure plot of threshold array values from FIG. 6 that have been modified using threshold value swapping to compensate for missing raster columns 7, 17, and 27.

Figure 9:
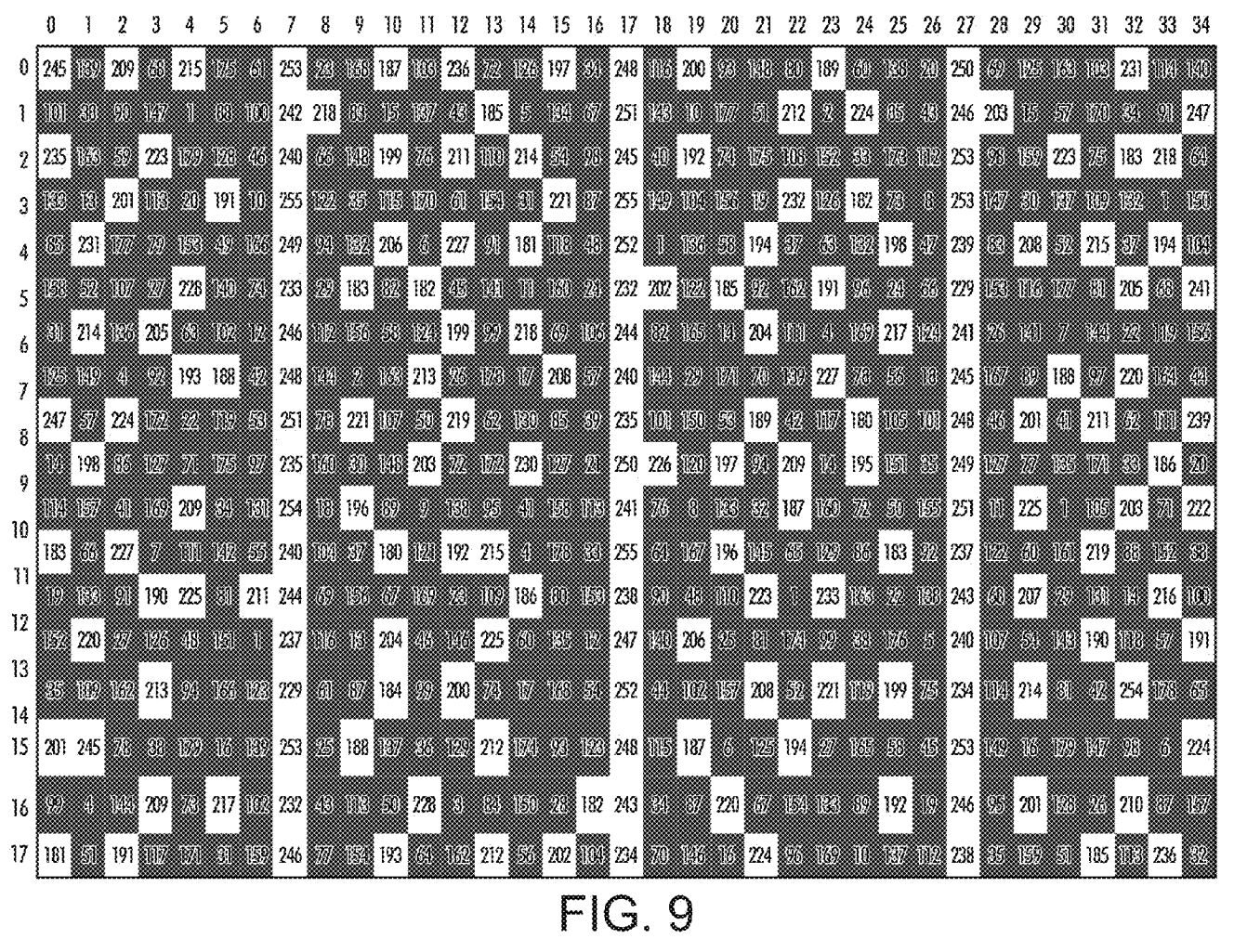

Cell shading in FIG. 9 illustrates an exemplary binary result of halftoning a uniform 70% gray image using threshold values from FIG. 8 with raster columns 7, 17, and 27 missing. Threshold values used are superimposed at each pixel location in the diagram.

Figure 10:
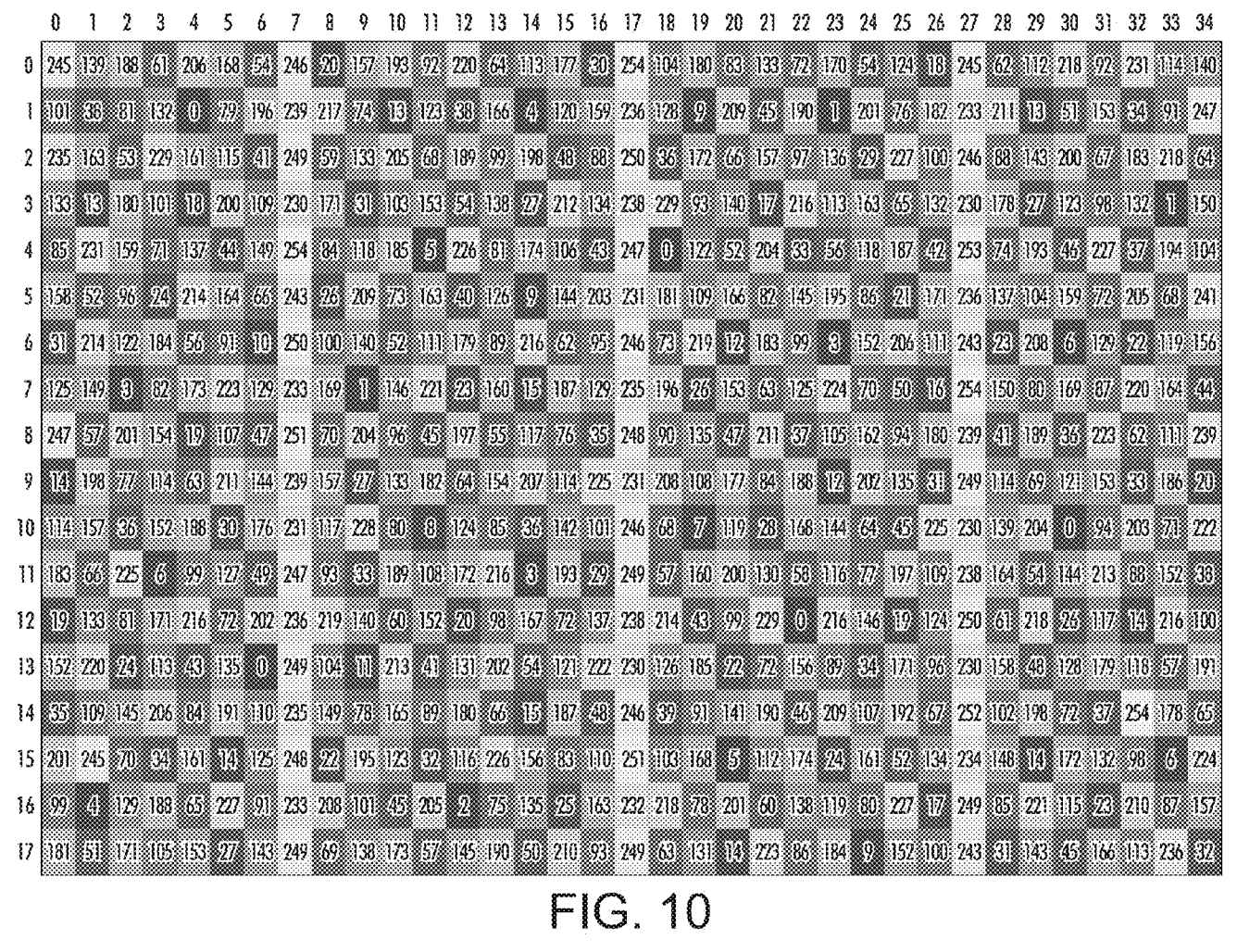

FIG. 10 illustrates an exemplary exposure plot of threshold array values from FIG. 6 that have been modified using scaling rather than swapping to compensate for missing columns 7, 17, and 27.

Figure 11:
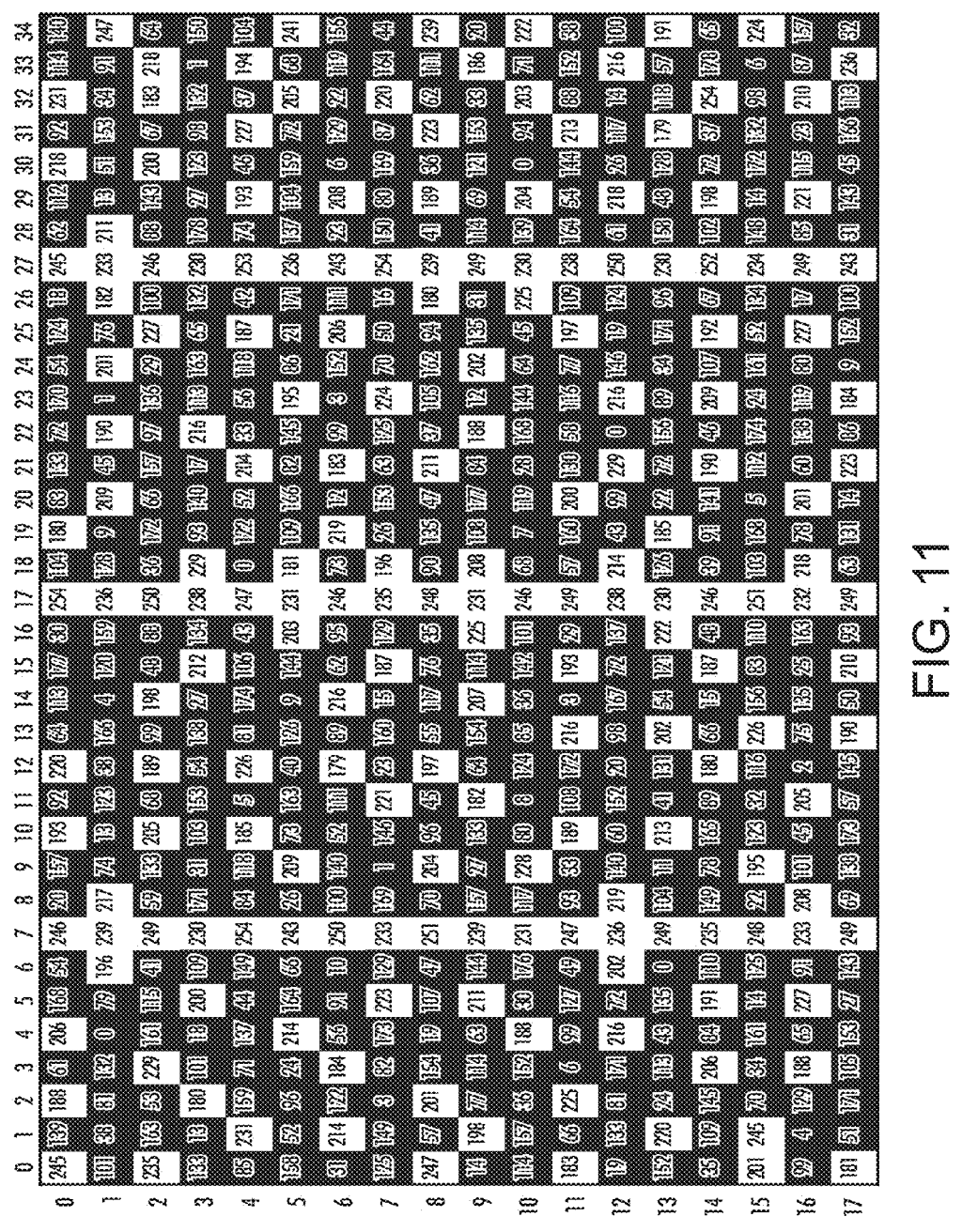

Cell shading in FIG. 11 further illustrates an exemplary binary result of halftoning a uniform 70% gray image using threshold values from FIG. 10 with raster columns 7, 17, and 27 missing. Threshold values used are superimposed at each pixel location in the diagram.

Figure 12A:
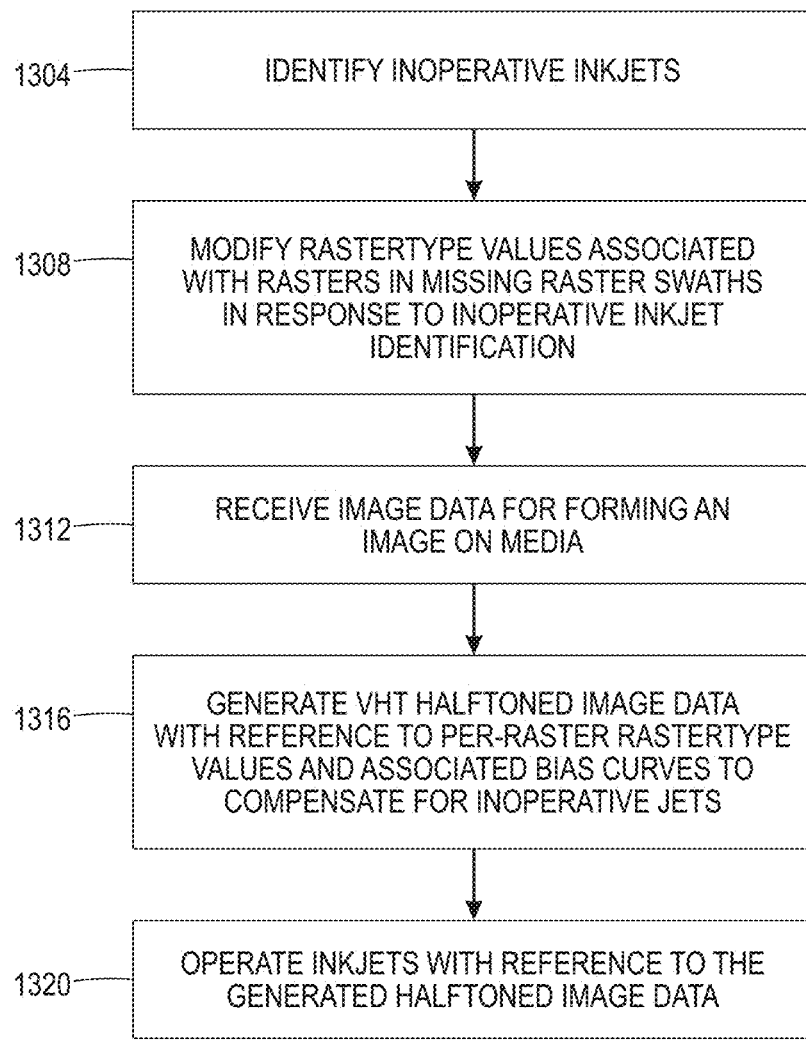

FIG. 12A is a flow diagram of a third exemplary embodiment to compensate for inoperative inkjets. This embodiment works with vector halftoning (VHT).

Figure 12B:
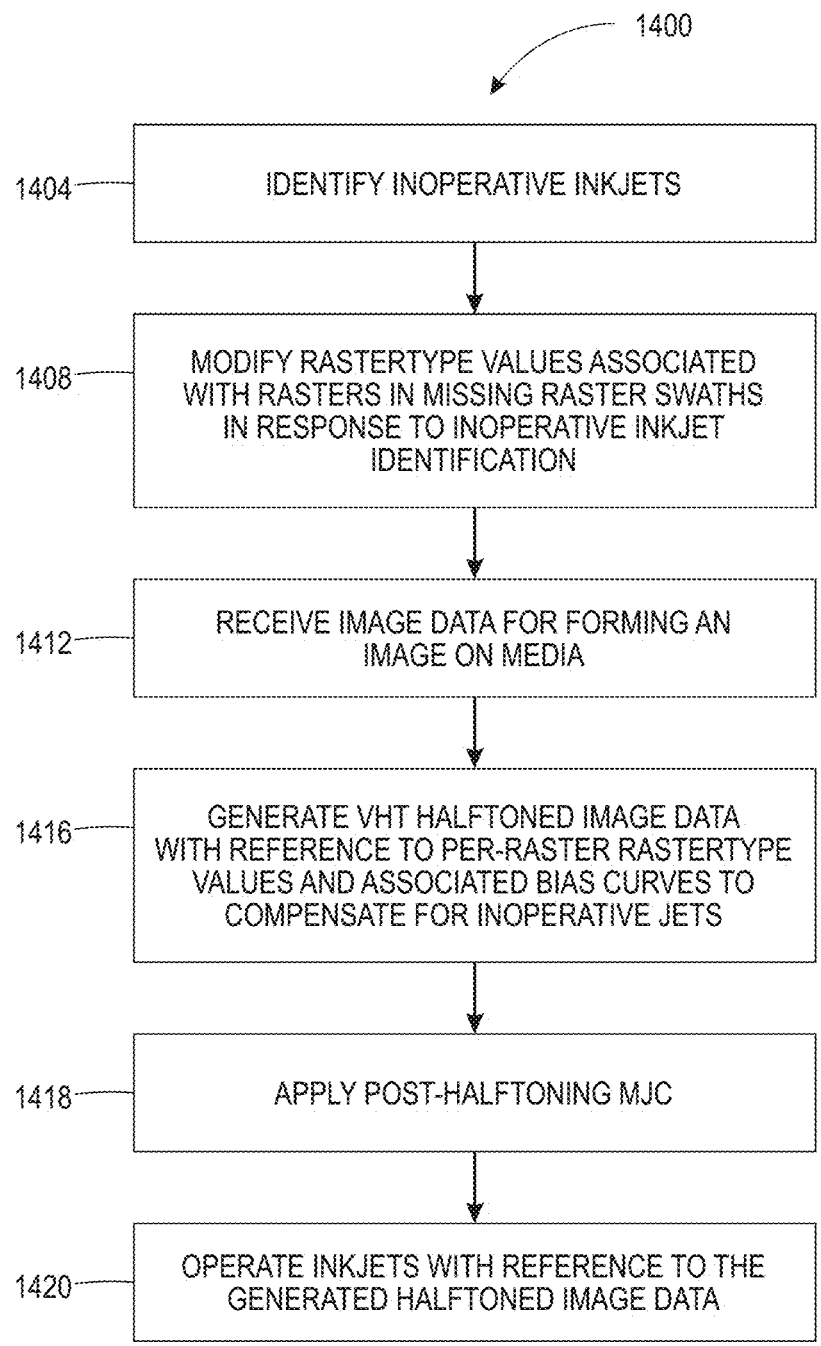

FIG. 12B illustrates a fourth exemplary embodiment to compensate for inoperative inkjets similar to the embodiment of FIG. 12A with the addition of a simplified post-halftoning MJC process.

Figure 13A:
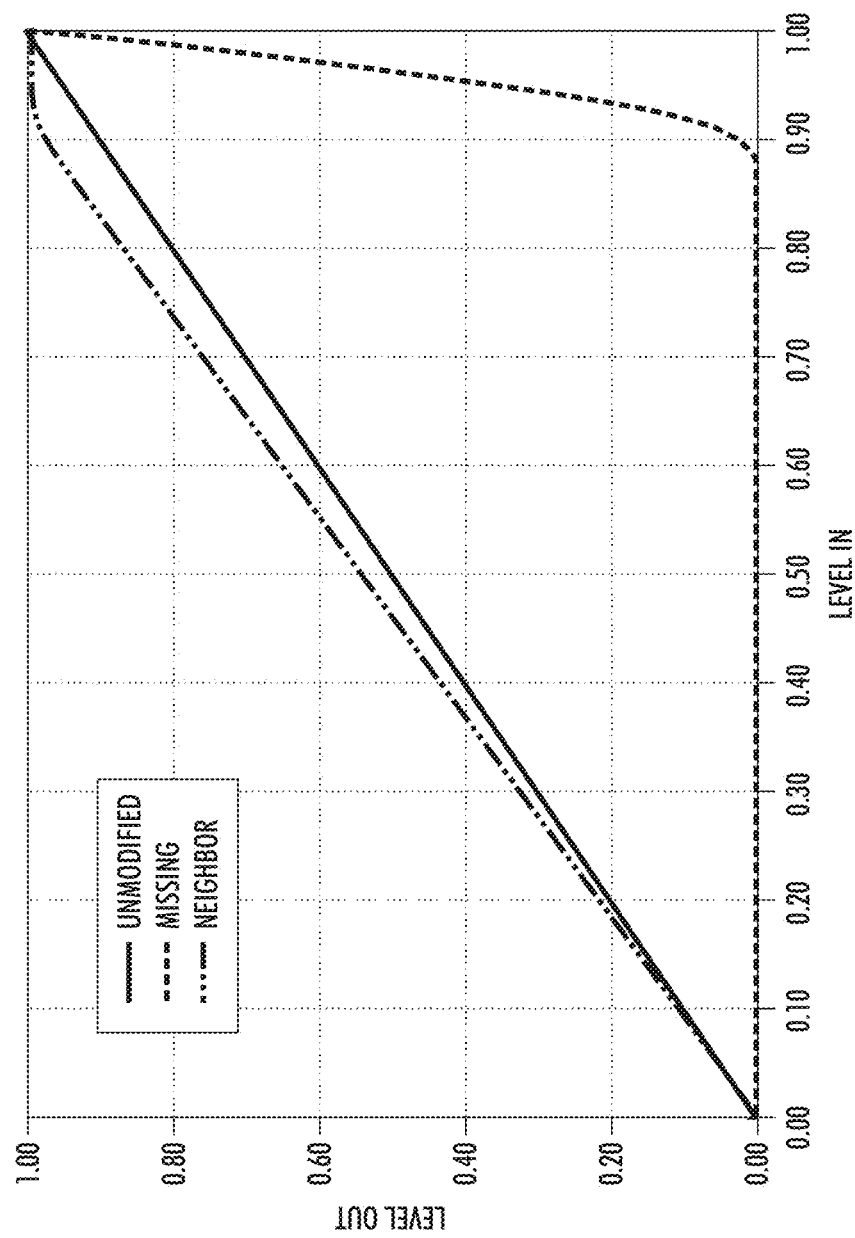

FIG. 13A illustrates three exemplary RasterType tone level bias curves with RasterType equal "Unmodified," "Missing," and "Neighbor."

Figure 13B:
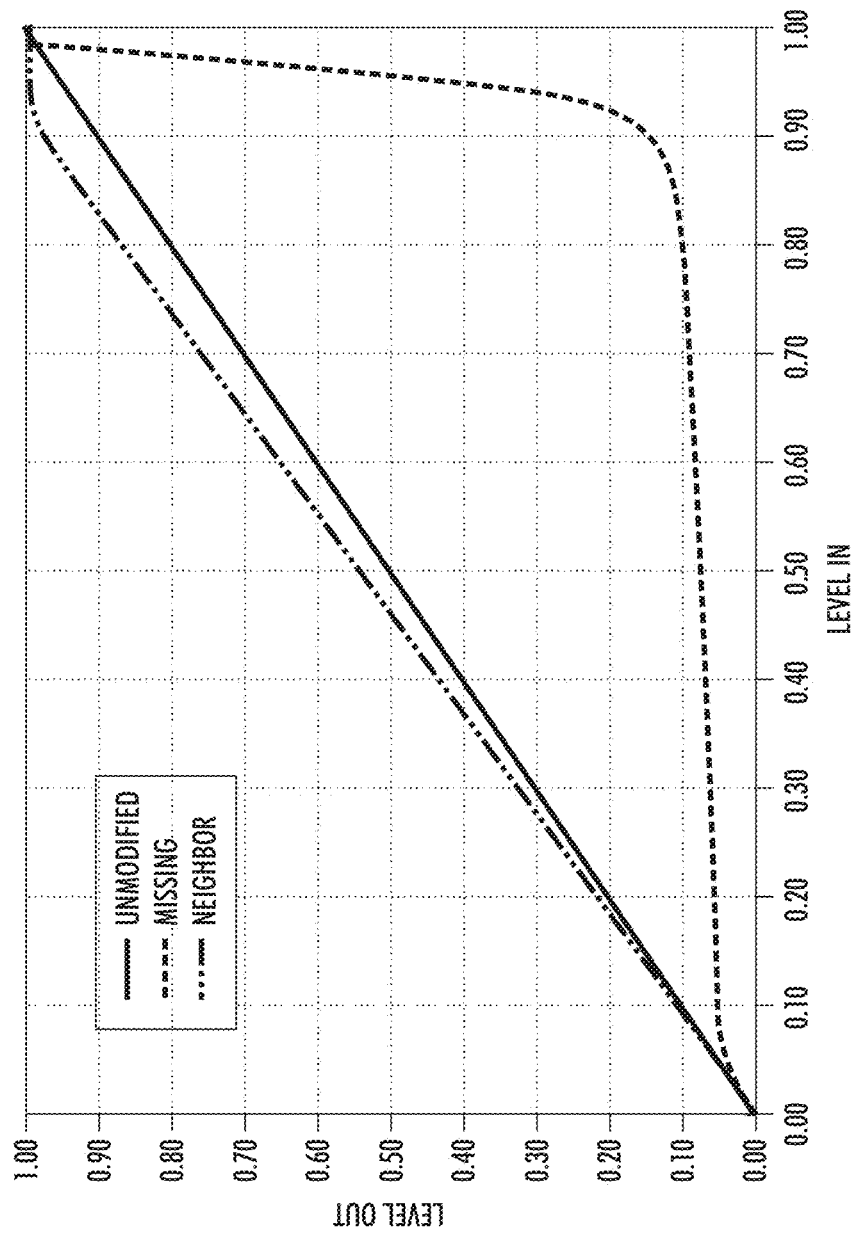

FIG. 13B illustrates three exemplary RasterType tone level bias curves with RasterType equal "Unmodified," "Missing," and "Neighbor" reserving non-zero pixel values in "Missing" RasterType raster columns representing levels below maximum correctable density to be repositioned by subsequent simplified or post-halftoning MJC processing.

Figure 14A:
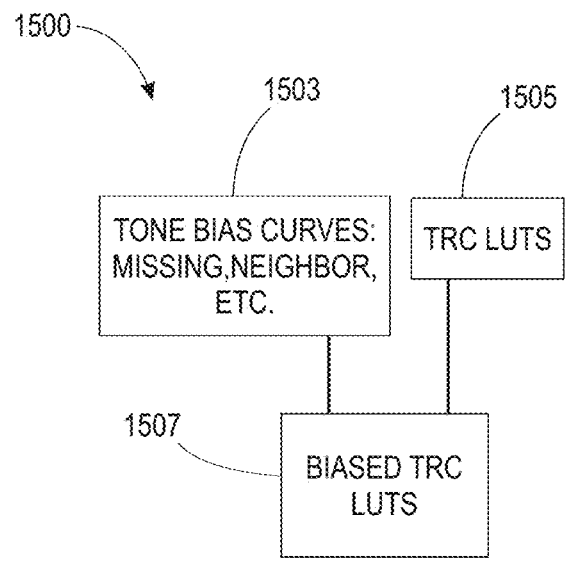
Figure 14B:
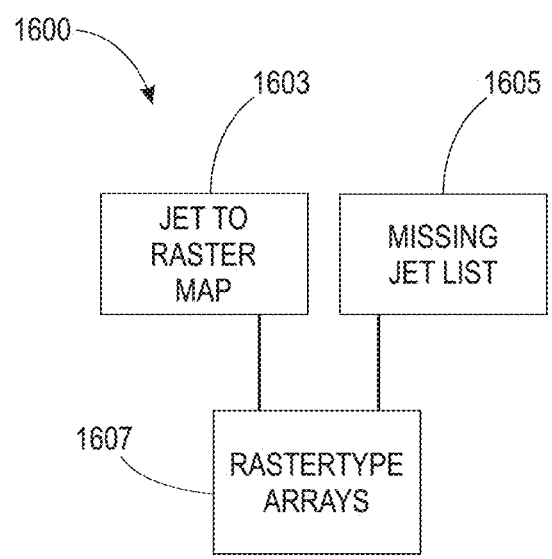
Figure 14C:
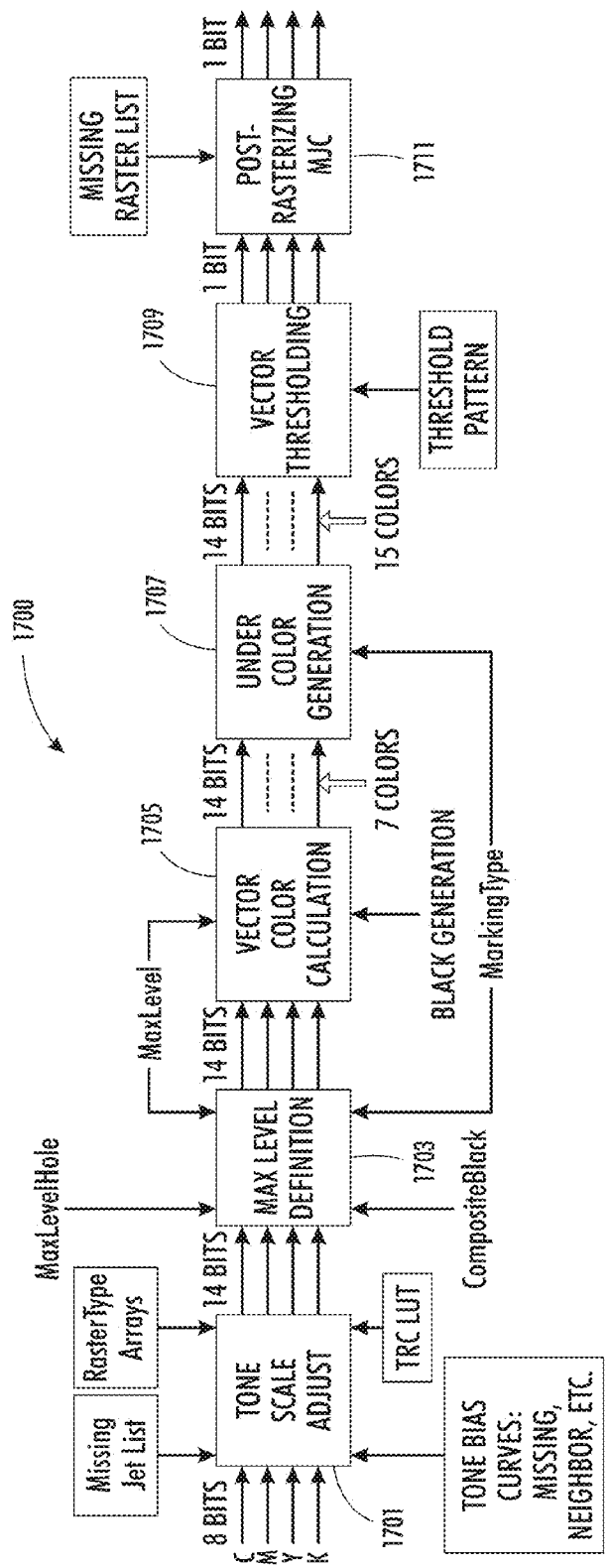

FIG. 14A is a flow diagram of an exemplary process used to produce "pre-biased" TRC LUTs, which are used in a digital rendering system such as the one illustrated in FIG. 14C. For each output device TRC, typically one per output color per output mode, one "pre-biased" LUT per non-identity embodiment specific "RasterType" is produced. Embodiments described herein, for example, define three RasterTypes: "Unmodified," "Missing," and "Neighbor." RasterType "Unmodified" represents an identity transform.

FIG. 14B is a flow diagram of an exemplary process used to produce "RasterType Arrays" from, for example, inoperative inkjet lists, output mode specific inkjet-to-raster mapping tables and embodiment specific "RasterType" definitions. The "RasterType Array records "RasterType" designation for each output raster column. The per-raster "RasterType" designation is used by embodiments of a digital rendering system such as the one depicted in FIG. 14C as an index to identify which pre-computed tone response bias curve to apply for each raster to compensate for currently inoperative jets.

FIG. 14C illustrates an exemplary Vector Halftoning (VHT) system that implements the methods discussed in this document. For each output pixel, before halftoning, the system selects a pre-biased TRC LUT by RasterType designation and applies it to the input pixel value in the "Tone Scale Adjustment" processing. Simplified or post-halftoning MJC processing is also included.

Figure 15:
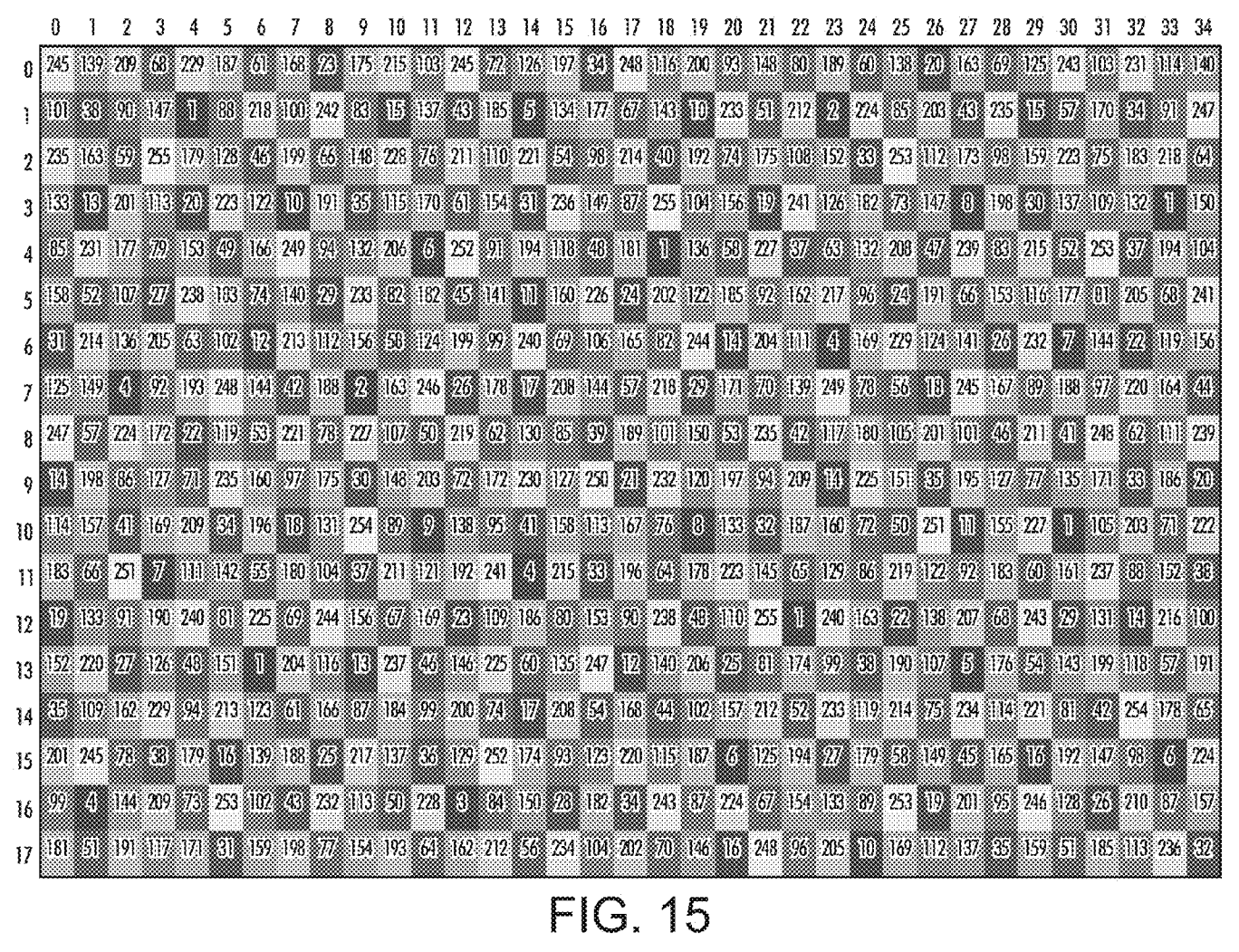
Figure 16:
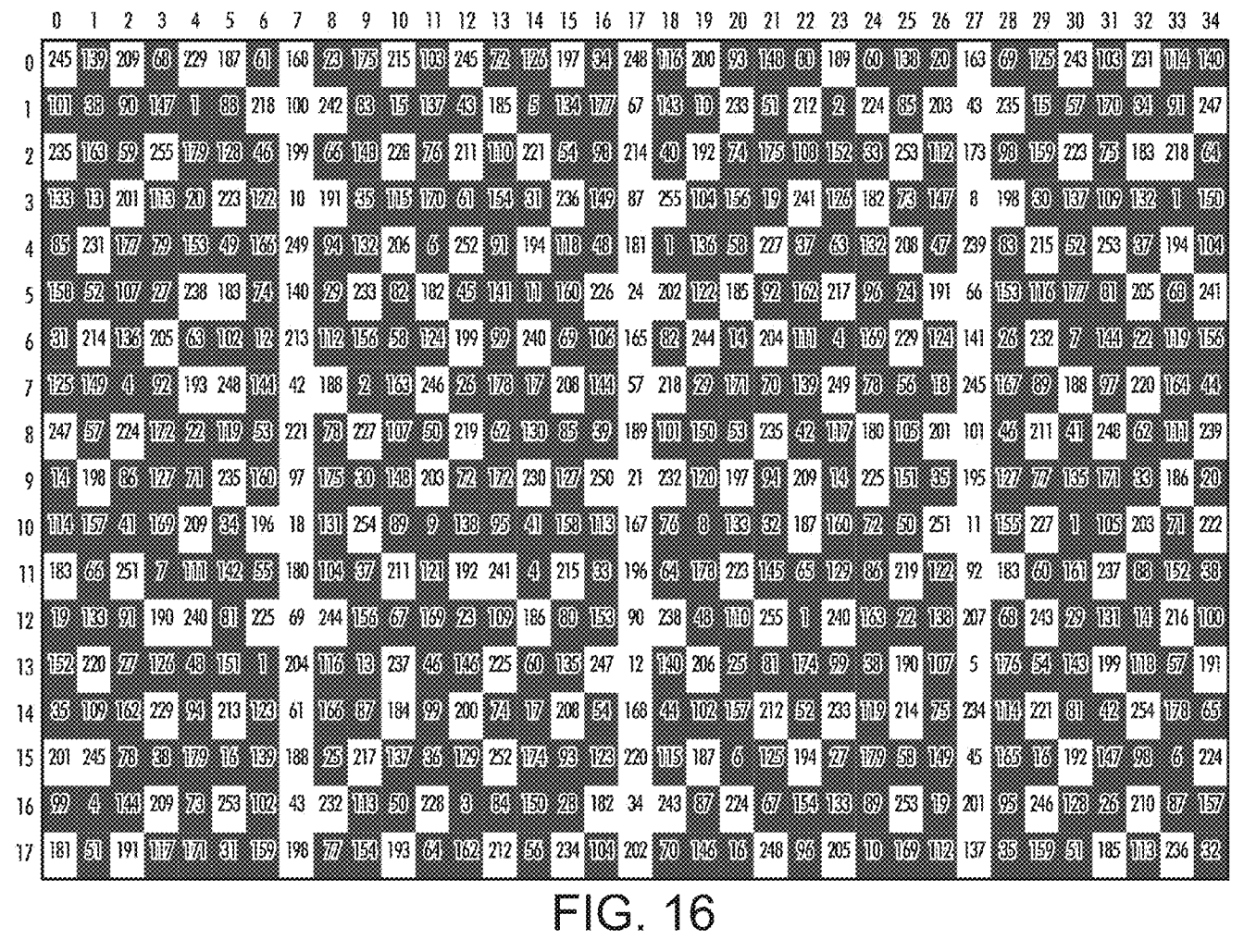
Figure 17:
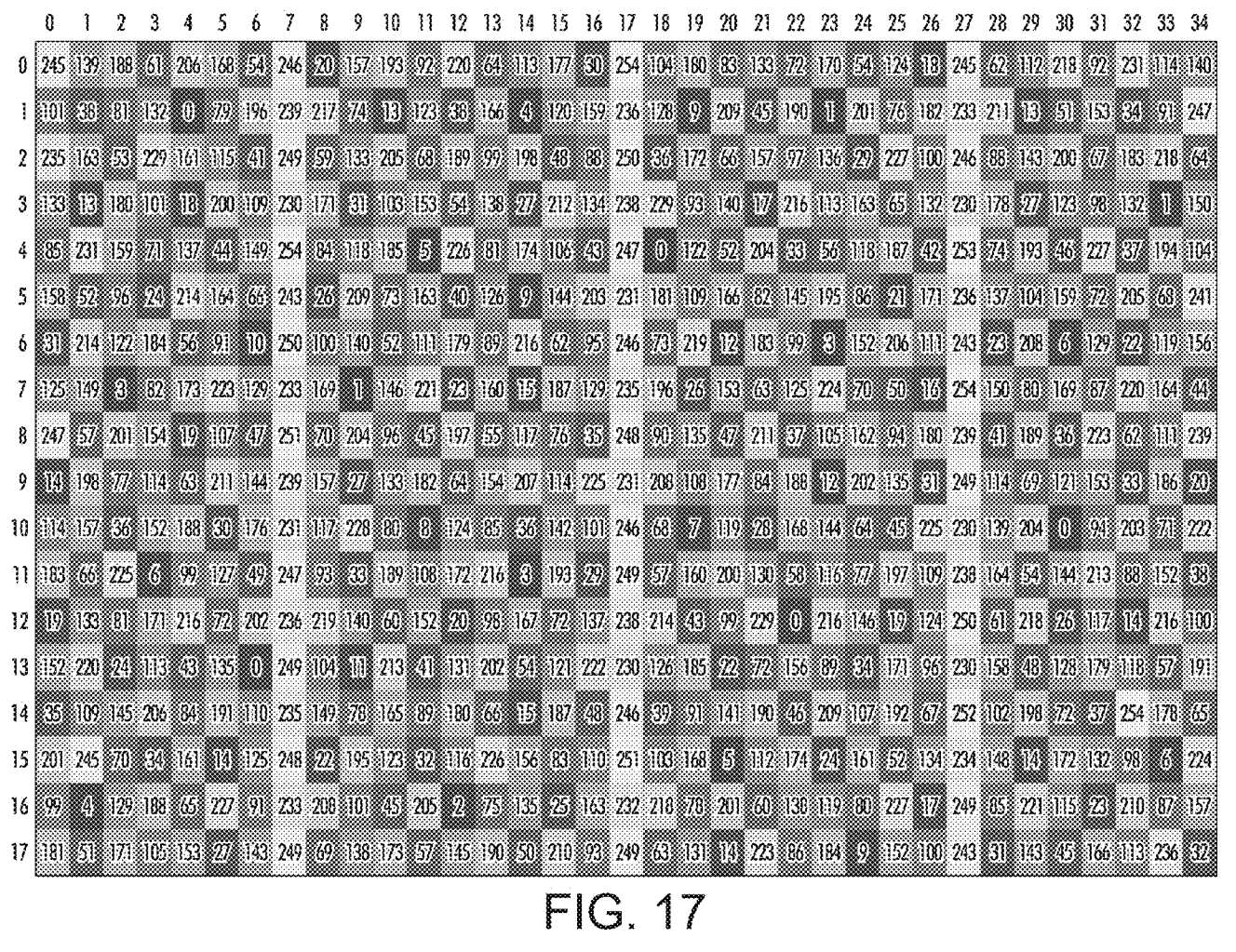
Figure 18:
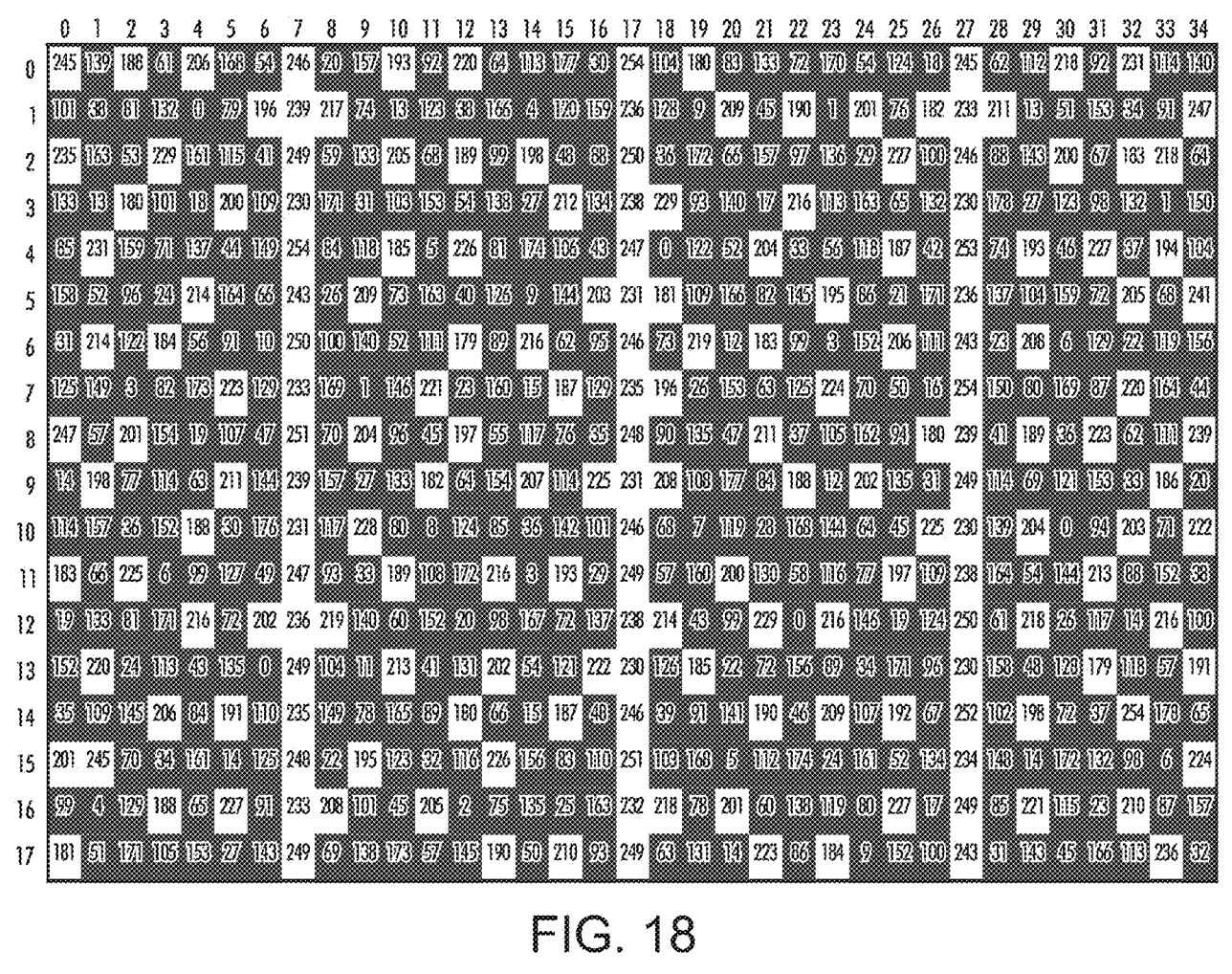

FIG. 15 illustrates an exemplary exposure plot of a portion of the unmodified threshold array used in FIG. 16, FIG. 17, and FIG. 18 to describe vector halftone based MJC processing.

Shading in FIG. 16 represents marked pixel locations in a portion of the binary output bitmap resulting from vector halftoning a uniform 70% gray image using the halftone pattern of FIG. 15 without applying MJC processing. Raster columns 7, 17, and 27 are unmarked to represent missing columns. Values from FIG. 15 are superimposed at each output pixel location for reference.

FIG. 17 is an exemplary exposure plot to visualize how RasterType indexed bias curves represented in FIG. 13A affect input image data. FIG. 17 illustrates the application of the bias values depicted in FIG. 13A to corresponding threshold matrix column values. This application of bias values modifies columns 7, 17, and 27 as if they are missing rasters with RasterType equal "Missing" and other columns from 2 to 31 as rasters of RasterType "Neighbor." FIG. 17 is included for visualization purposes only. In practice, unlike scalar halftone based MJC embodiments 100 and 200, vector halftone based MJC (embodiments 1300 of FIG. 12A and 1400 of FIG. 12B) apply biased TRC LUT values to image data according to per-raster RasterType as part of the "Tone Scale Adjustment" processing depicted in FIG. 14C. The VHT based MJC embodiments described herein do not modify threshold matrix values.

Shaded cells in FIG. 18 illustrate marked pixel locations in an exemplary binary bitmap resulting from vector halftoning a uniform 70% gray image with VHT based MJC applied. As represented in FIG. 14, TRC curves applied within VHT are biased according to per-raster bias functions selected by per-raster RasterType. Corresponding pseudo-threshold values from FIG. 17 are superimposed at each pixel location for reference.

Figure 19:
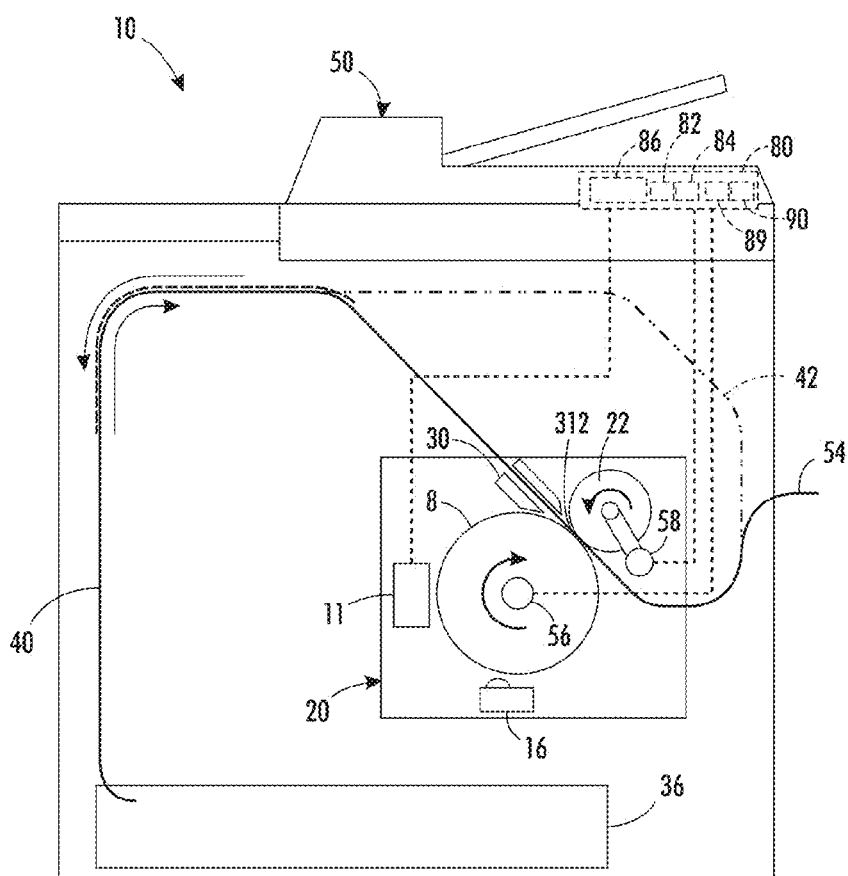

FIG. 19 depicts a prior art imaging apparatus in which elements pertinent to the present disclosure are shown.

DETAILED DESCRIPTION

For a general understanding of the environment for the device disclosed herein as well as the details for the device, reference is made to the drawings. In the drawings, like reference numerals designate like elements. As used herein, the words "printer" and "imaging device," which may be used interchangeably, encompass any apparatus that forms an image with marking material on media for any purpose, such as a digital copier, bookmaking machine, facsimile machine, a multi-function machine, or the like. As used herein, the words "jets" and "inkjets" can be used interchangeably to identify a component that applies marking material to a surface to form a portion of an image corresponding to image data. As used herein, "inoperative inkjets" include "malfunctioning inkjets," "missing inkjets," or the like. "Missing rasters" are the raster columns an inoperative jet is responsible for marking. "Missing threshold array columns" or "missing threshold columns" and the like are threshold array columns aligned with missing raster columns used to halftone corresponding missing rasters.

As used herein, "input data," "input image data," "video data," "input image," and the like refer to continuous-tone image data after color conversion to the native output device color space and are typically scaled to output pixel resolution, ready to be halftoned to output depth and format. For simplicity, examples given assume linear tone response from the output device and human eye so tone response transfer functions are reduced to identity functions. Also herein, "continuous-tone," "contone," and the like refer to the color depth of pre-halftoned data, which are typically eight bits or more per output color channel. As used in this document, the term "non-image data" refers to data used to process input data, input image data, video data, or an input image. These data include the threshold values in a threshold matrix used for halftoning these input data and to TRC curves, particularly, the RasterType bias curves applied to such data prior to halftoning the input data.

As used herein, "rasters" are vertical arrays or columns of pixels in a rectangular pixel matrix or "bitmap." Raster columns are aligned in the process direction. This alignment differs from common usage where rasters are row aligned in the fast scan direction.

As used herein, a "swath" is a group of typically adjacent working rasters including at most one centrally positioned missing raster. An N-raster swath includes at least N−1 working rasters and at most one centrally located missing raster, sometimes called a target raster. If a non-target missing raster is encountered within the swath area it is skipped and not counted as part of the N raster wide swath. Subsequent swath processing ignores these interstitial missing rasters. If a missing raster other than the target is encountered within the swath the missing raster is skipped and ignored for swath processing. This processing ensures a minimum ratio of working to total rasters in the swath but working to one missing rasters per swath and in real terms widens the swath by one raster for each non-target missing raster encountered. If an N raster swath contains no missing rasters it is simply N consecutive working rasters wide. The word "swath" may also refer to a similarly arranged group of threshold array columns referenced to halftone a raster swath. Threshold array columns are said to be aligned with or to correspond to image rasters when they are the threshold columns that are referenced to halftone the rasters.

As used herein, the words "matrix" and "array" may be used interchangeably. In the description of the embodiments herein, a statement that the process does some function or performs some action refers to a processor executing programmed instructions stored in a memory operatively connected to the processor to do the function or perform the action or it refers to the processor generating signals to operate one or more electrical or electromechanical components to perform the function or action. Also in this document, "halftone matrix," "halftone pattern," "threshold matrix" and "threshold array" refer to typically pre-determined two-dimensional arrays of input image independent threshold values. Threshold matrices are used to implement both scalar and vector (VHT) point-process halftoning. For convenience, the same eight-bit per pixel valued stochastic threshold pattern fragment, presumed missing raster columns and interlaced print mode are used in all examples in this disclosure.

A "LUT" refers to a memory configured as a look up table, which can be used to implement discrete scalar transforms on image data. A "TRC" is a scalar tone reproduction curve that may be implemented as a LUT. In this document, "bias curves" are typically pre-computed scalar continuous tone valued functions used to modify image values to reduce ink in missing rasters while increasing ink in nearby working rasters. Because TRCs and bias curves modify the continuous tone image data that are referred to as data conversion parameters in this document. In the embodiments described, bias curves are composed with halftone threshold array column values, or per-raster TRC values or are applied according to the index RasterType as part of vector halftoning (VHT). Each RasterType index corresponds to a bias curve. A raster's RasterType is determined by its position relative to nearby missing rasters. Bias curves are scalar functions composed with each threshold value in corresponding threshold array columns(s) in a threshold matrix or each input pixel value in corresponding input rasters. For simplicity, continuous tone input image, halftone threshold, TRC and bias curve values are all assumed to be linear with respect to output density. This assumption makes bias curves composed with input image, TRC, or halftone threshold value data equivalent to curves resulting from their application. In other words, when comparing column tone reproduction before and after modification, the curve for the bias function applied is equivalent to the after modification curve.

Embodiments described in this document refer to an exemplary inkjet printer utilizing a ten-raster interlaced print mode with three imaging drum revolutions required to form a complete ink image or impression for transfer to one side of a single sheet of media. That is, during one revolution of the imaging drum the printhead ejects ink to form a first third of the image and then the printhead is moved in the cross-process direction for the second revolution of the drum. The printhead is then operated to form the second third of the image and the printhead is again moved in the cross-process direction so the printhead can operate during the third revolution of the drum to complete the image. The image is then transferred to a media sheet as the sheet passes through a nip formed between the imaging drum and a transfer roller. Consequently, each non-edge inkjet is responsible for three rasters of image data, one for each revolution. Also, unless stated otherwise, included examples assume a single populated color channel input rendered to a single output color plane.

FIG. 19 depicts a prior art imaging apparatus 10, or at least a portion of an imaging apparatus, in which elements pertinent to the present disclosure are shown. Although the system and method are discussed in the context of a raster interlaced multiple pass solid ink jet printer, they may be used with other digital image marking and presentation systems including non-interlaced single pass multi-function printers and systems that use other types of marking agents and transfer methods, such as electrostatically transferred toners, and other forms of liquid ink, such as aqueous, emulsified gel, or UV curable inks and more generally may be applicable to any digital image display system employing data flow and processing analogous to the systems and processes described, including digital image forming systems emitting light such as emissive displays. The printer 10 of FIG. 19 is configured to form ink images on an imaging drum 8 using a print mode implemented with a ten raster interlace for a prudent maximum of ten rasters per swath. As used in this document, the term "raster" refers to a column of image data corresponding to one particular inkjet that is oriented in a direction of media movement past the printheads.

The printer 10 includes a media supply unit 36, media supply path 40, duplex media path 42, media finisher 54, controller 80, and an imaging unit 20. The imaging unit 20 includes an imaging drum 8, imaging drum actuator 56, marking unit 11, drum maintenance unit 16, transfix roller 22, transfix actuator arm 58, and preheater 30. Marking unit 11 may include one or more inkjet printheads that eject ink drops onto the imaging drum 8 to form the ink images using the print mode described above. The marking unit 11 may include multiple printheads that are configured to eject drops of inks having various colors to form multi-color images. In one configuration, the marking unit 11 ejects inks having cyan, magenta, yellow, and black (CMYK) colors that combine to form multi-color images. Different inkjet printer configurations may use solvent-based inks, aqueous inks, UV curable inks, gel inks, phase-change inks, and any other form of ink that is suitable for use with indirect printing.

The marking unit 11 forms images on the surface of the imaging drum 8 as the imaging drum 8 rotates past the marking unit 11. An actuator 56 rotates the imaging drum 8 past the marking unit 11 multiple times as the marking unit 11 ejects ink drops to form ink images on the drum. In some printer embodiments, the actuator 56 rotates the imaging drum 8 at a higher angular velocity while the marking unit 11 forms ink images on the imaging drum 8 than during transfix operations when the ink images are transferred to media sheets. The imaging drum 8 is configured to receive and hold ink images that are transfixed to media sheets passing through a nip formed between the imaging drum 8 and the transfix roller 22. Prior to forming latent images on the imaging drum 8, the drum maintenance unit 16 applies a coating of release agent to the surface of the imaging drum 8. The release agent is a chemical, such as silicone oil, that prevents latent ink images formed on the imaging drum from adhering to the imaging drum 8 instead of transfixing to the media sheets. The ink in the ink images floats on the layer of release agent prior to being transferred to the media sheet.

Transfix roller 22 is configured to apply pressure to a media sheet as the media sheet contacts the imaging drum 8 to transfer a latent ink image formed on the imaging drum 8 to the media sheet. The transfix roller 22 is movable between a position where the transfix roller 22 engages the imaging drum 8 to form a nip 312, and a second position where the transfix roller 22 is removed from engagement with the imaging drum 8. Printer 10 includes an actuator arm 58 that moves the transfix roller between the two positions. The actuator arm 58 moves the transfix roller 22 out of engagement with the imaging drum 8 during image formation as the marking unit 11 forms ink images on the imaging drum 8, and moves the transfix roller 22 into engagement with the imaging drum 8 to transfix the ink images on media sheets. The transfix roller 22 is not directly connected to a motor that rotates the transfix roller 22, but the transfix roller 22 rotates as the imaging drum 8 rotates when engaged to the imaging drum 8.

Operation and control of the various subsystems, components and functions of the machine or printer 10 are performed with the aid of a controller or electronic subsystem (ESS) 80. The ESS or controller 80, for example, is a self-contained, dedicated mini-computer having a central processor unit (CPU) 82 with electronic storage 84, and a display or user interface (UI) 86. The ESS or controller 80, for example, includes a sensor input and pixel placement control circuit 89. In addition, the CPU 82 reads, captures, prepares, and manages the image data flow between image input sources, such as scanning system 50, or an online or a work station connection 90, and the marking unit 11. As such, the ESS or controller 80 is the main multi-tasking processor for operating and controlling all of the other machine subsystems and functions.

The controller 80 may be implemented with general or specialized programmable processors that execute programmed instructions. The instructions and data required to perform the programmed functions may be stored in memory associated with the processors or controllers. The processors, their memories, and interface circuitry configure the controllers to perform the image data processing, which is described more fully below. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits.

Also, the circuits described herein may be implemented with a combination of processors, ASICs, discrete components, or VLSI circuits. Multiple controllers configured to communicate with a main controller 80 may also be used.

Controller 80 is operatively connected to various components in the printer 10, including the marking unit 11, imaging drum actuator 56, and transfix roller actuator arm 58. The CPU 82 in controller 80 obtains programmed instructions from the electronic storage 82 and executes the programmed instructions to perform various operations in the printer 10. The controller 80 operates the transfix actuator arm 58 to move the transfix roller 22 in and out of engagement with the imaging drum 8. The controller 80 also operates the imaging drum actuator 56 to rotate the imaging drum at one or more rotational velocities. The controller 80 also operates the marking unit 11 to form ink images on the imaging drum 8, and operates the media paths 40 and 42 to control the movement of media sheets through the printer 10.

The halftoning processes disclosed in this document improve compensation for inoperative inkjets in image rendering systems that produce typically binary output image data using scalar and vector point-process halftoning. Four embodiments of the processes are described. The first, FIG. 1A embodiment 100, and second, FIG. 1B embodiment 200, were developed for scalar point-process threshold array halftoning and the third, FIG. 12A embodiment 1300, and fourth, FIG. 12B embodiment 1400, were developed for vector point-process halftoning (VHT).

Figure 4:
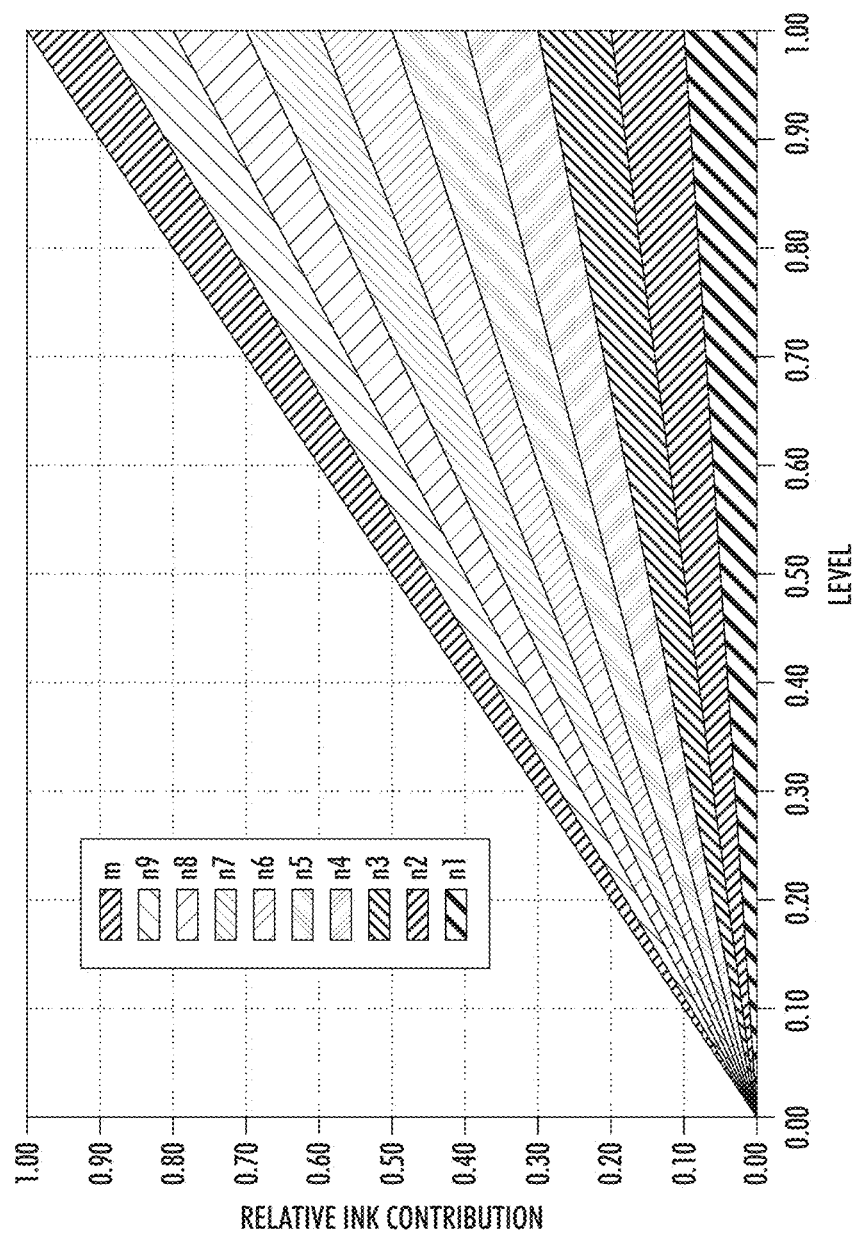
FIGS. 4, 5, and 19 apply to all embodiments described herein.

FIG. 4 depicts a graph of an exemplary ink distribution over a swath of ten typically adjacent rasters including one central target missing raster (corresponding to an inoperative inkjet) before applying MJC. Rasters n1 to n9 correspond to operative inkjets and raster m corresponds to an inoperative inkjet.

Figure 5:
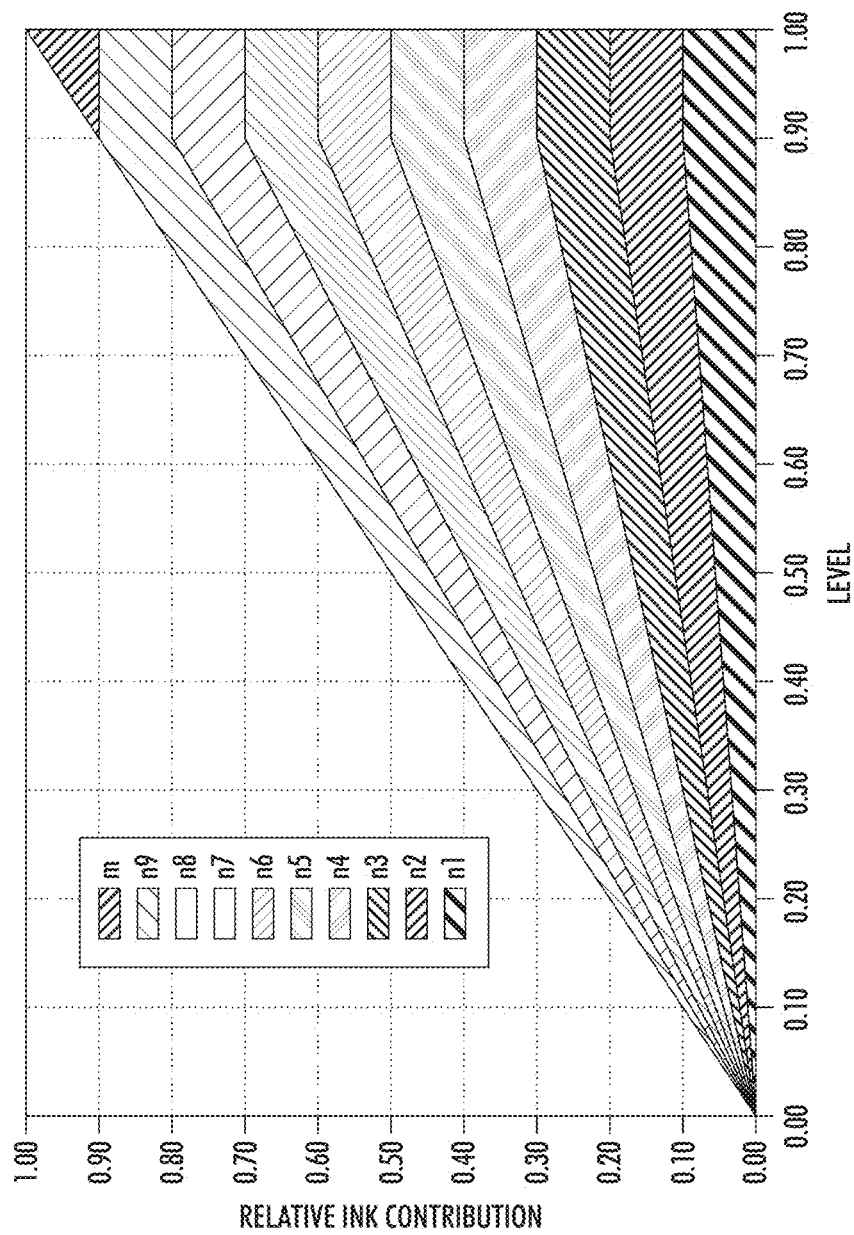

As in FIG. 4, FIG. 5 depicts a graph of an exemplary ink distribution achieved over a ten-raster swath including a single typically central missing raster corresponding to an inoperative inkjet. The graph in FIG. 5 is a simplified representation of the net effect of MJC processing relative to the unprocessed swath of FIG. 4. FIG. 4 and FIG. 5 are independent of the specific MJC embodiment or embodiments used. FIG. 5 represents a swath compensated to a maximum correctable density of 90%. In other words raster m is not required for input below 90%. If an input image requires the ten-raster swath to produce density greater than 90% and raster m is unavailable, MJC will fail. However, if additional printing passes can be added to allow a different working jet to fill in for the missing raster (typically with a performance cost) the swath modified according to FIG. 5 can be printed successfully without additional modification. The same principle is also used when MJC is applied to a swath where all rasters are working. As long as the net effect of swath modification conserves density over the swath as depicted in FIG. 5, printing with all raster columns working produces acceptable output.

The simplified curves in FIG. 5 for working rasters n1 to n9 are shown with each contributing the same amount of ink but, as long as the required total distribution is met, each raster's contribution can be different. Often, when a complementary post-halftoning MJC process is not used, rasters closer to the missing raster provide more ink. Conversely, if data values below the maximum correctable level are retained in missing raster columns to be repositioned by a post-halftoning MJC process, it can be advantageous to reduce use of threshold columns nearest the inoperative inkjet, reserving these positions for repositioning by the post-halftoning MJC process. This reservation provides nearby target locations for the simplified post-halftoning MJC process. A good balance may include both heaver reliance on threshold columns nearer the missing raster column and little or no modification to threshold values in threshold columns immediately adjacent missing raster columns.

A useful feature of this method is compatibility with known post-halftoning (sometimes called post-render) MJC. Since the disclosed method excels at low spatial frequency correction, it is a good complement to post-halftoning MJC that can work well for high spatial frequency artifacts but often fails to adequately compensate for low spatial frequency artifacts due to inoperative jets. Also, in systems where maximum output density can be greater than the maximum correctable density failure is a possibility. In these systems, post-halftoning missing jet compensation typically also includes MJC success assessment.

An implementation of this method may be added to any imaging device using known post-halftoning MJC without further modification. Since this method excels at low spatial frequency correction, it is a good complement to known post-halftoning MJC that can work well for high spatial frequency artifacts but can fail to adequately compensate for low spatial frequency artifacts due to inoperative jets. Alternatively, a post-halftoning MJC process greatly simplified over known processes may be used to achieve the same benefit. Most complexity and processing cost in post-halftoning MJC comes from large pixel neighborhood processing and edge detection, which are used to correct for low spatial frequency density variation and provide improved color matching. Since the method disclosed in this document can do a much better job compensating for density variation and matching color between modified and unmodified raster swaths, and achieves these goals at no output performance cost, no need exists for this functionality in the complementary post-halftoning MJC process identified in embodiments 200 in FIG. 1B block 218 and embodiment 1400 FIG. 12B block 1418. A "simplified" post-halftoning MJC process referred to herein may provide as little as unconditional marked pixel displacement from the missing raster to pixel locations in adjacent raster columns. In some embodiments post-halftoning processing may also be a good place to include MJC success assessment, if necessary. Both of these functionalities are previously known.

Figure 3A:
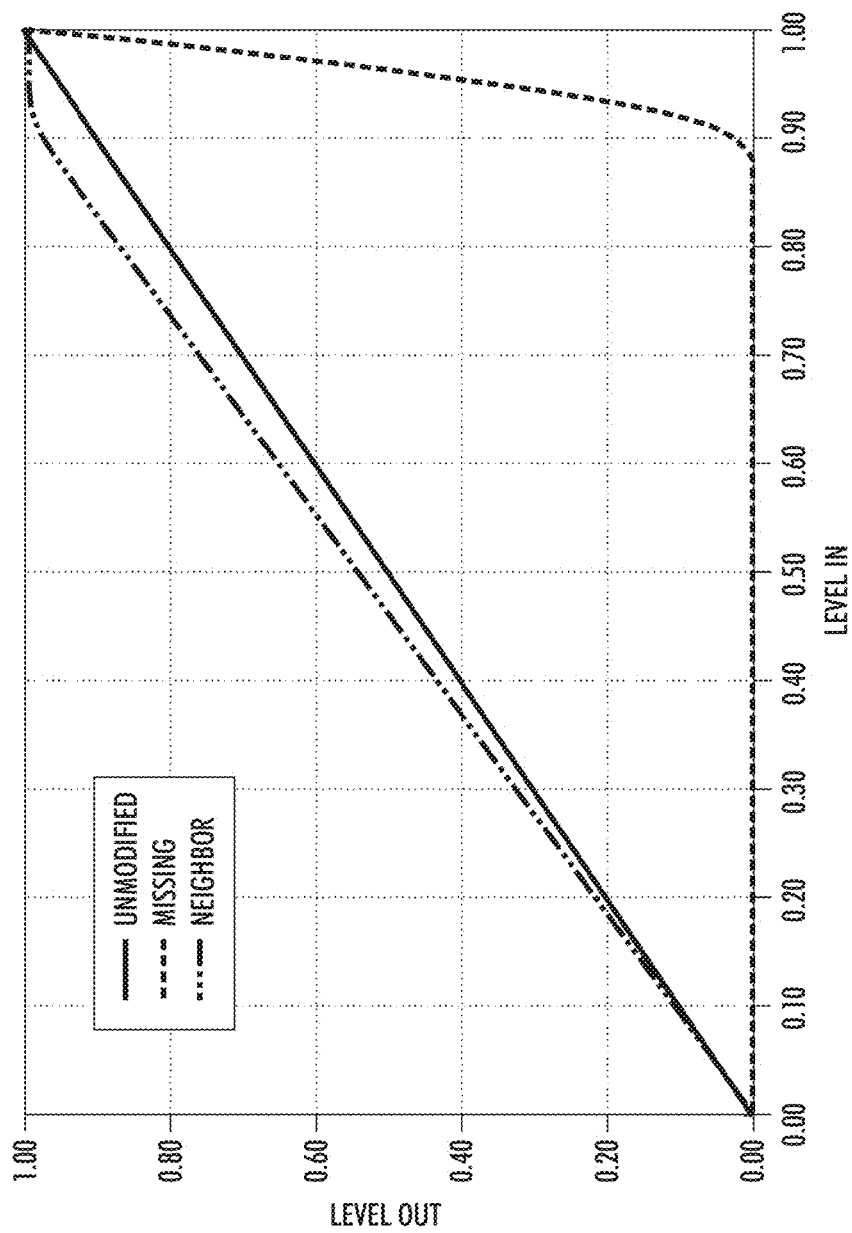
Figure 3B:
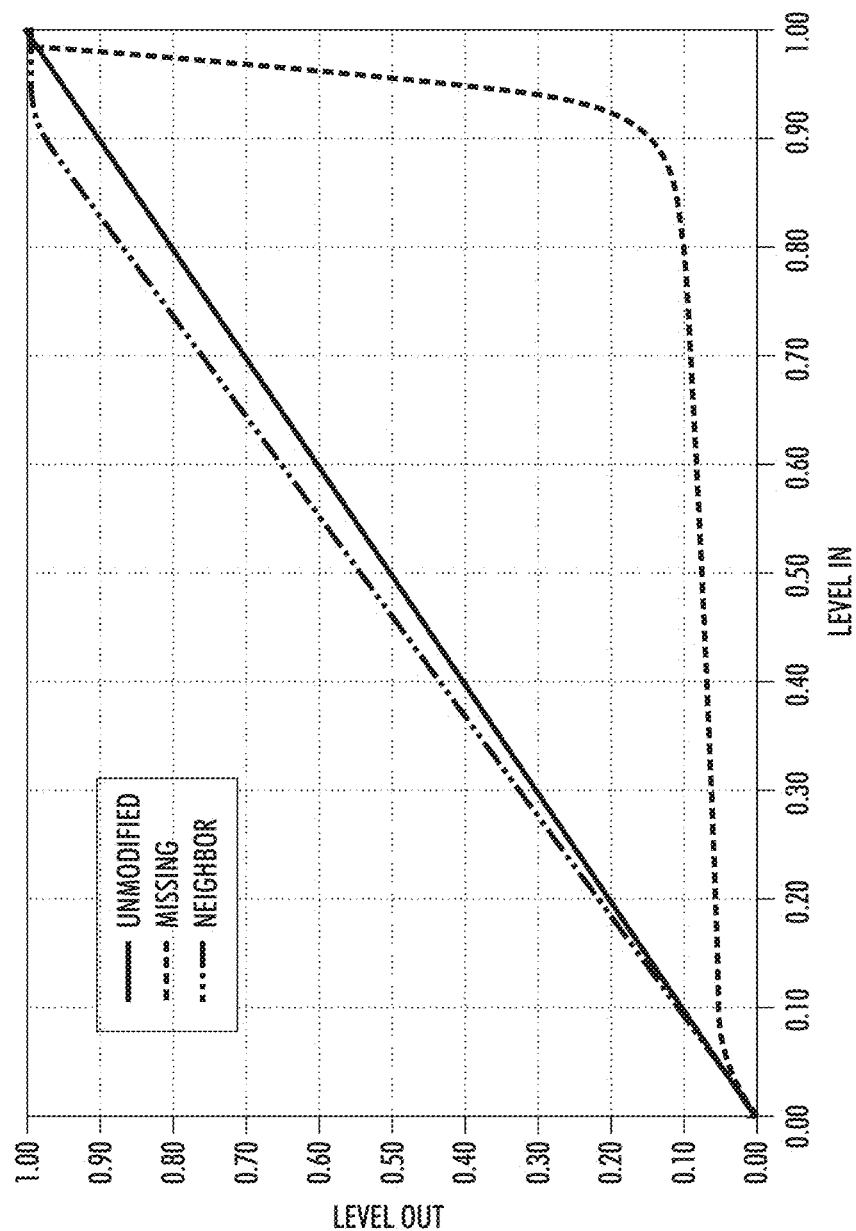

As depicted in FIG. 3B, MJC embodiment 200 reduces but may not eliminate all threshold values below the maximum correctable level in columns corresponding to missing rasters. In embodiment 200 and VHT embodiment 1400 described below, an input level dependent fraction of image data below the maximum correctable level coincident with missing rasters is intentionally halftoned into missing raster output columns to be repositioned to adjacent columns by a complementary simplified or known post-halftoning MJC process. Under some conditions this processing can better preserve some texture and fine detail.

Figure 1A:
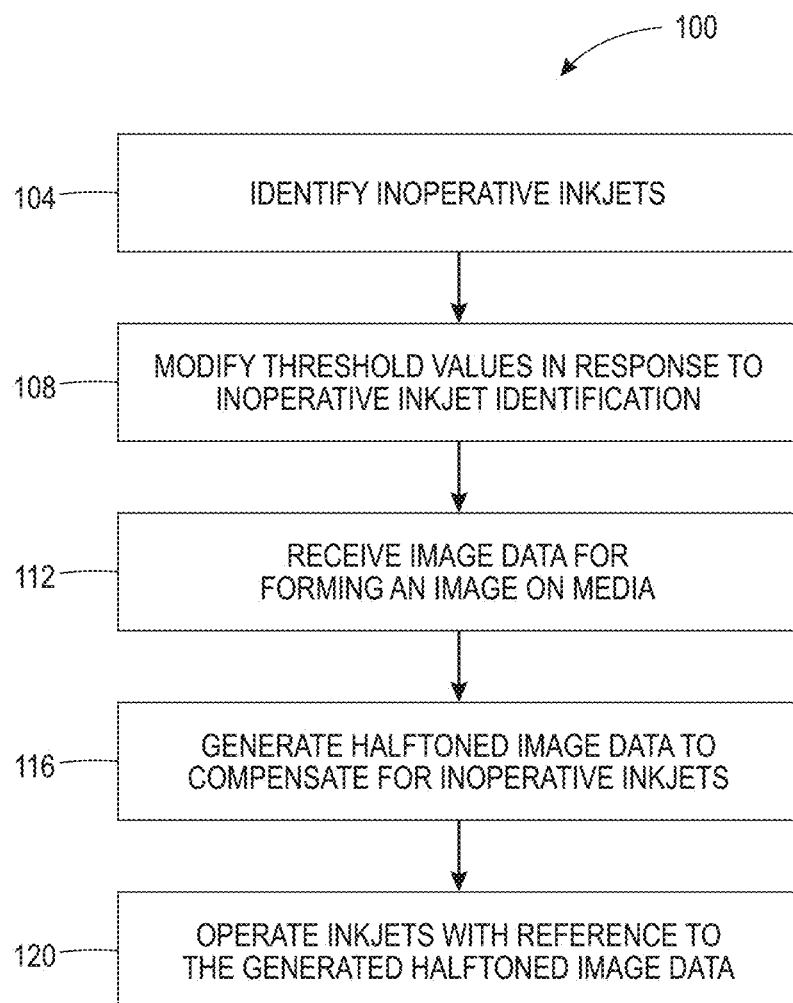

The benefit of a post-halftoning MJC process in the system can be appreciated in consideration of input image data rendered to produce a one pixel wide vertical line coincident with a missing raster of the same color. If MJC embodiment 100 of FIG. 1A is used, "Missing" threshold array columns are modified as illustrated in FIG. 3A. This modification eliminates all threshold values in the missing threshold column below the maximum correctable level causing the fine vertical input line to vanish from output. In some cases this omission may be noticeable. Alternatively, if MJC embodiment 200 in FIG. 1B (or embodiment 1400 in FIG. 12B described below) which include simple post-halftoning processing is used, residual binary data rendered into missing rasters may be retained, printed one pixel displaced to the left or right of the missing raster. If "Missing" rasters are biased as depicted in FIG. 3A and FIG. 13A, this processing can be applied to input data levels above the maximum correctable level. If, as depicted in FIG. 3B and FIG. 13B, data from correctable levels below the maximum correctable level are reduced but not eliminated from the "Missing" threshold column, a remnant of fine dithered structure otherwise lost may also be preserved on output.

Figure 1B:
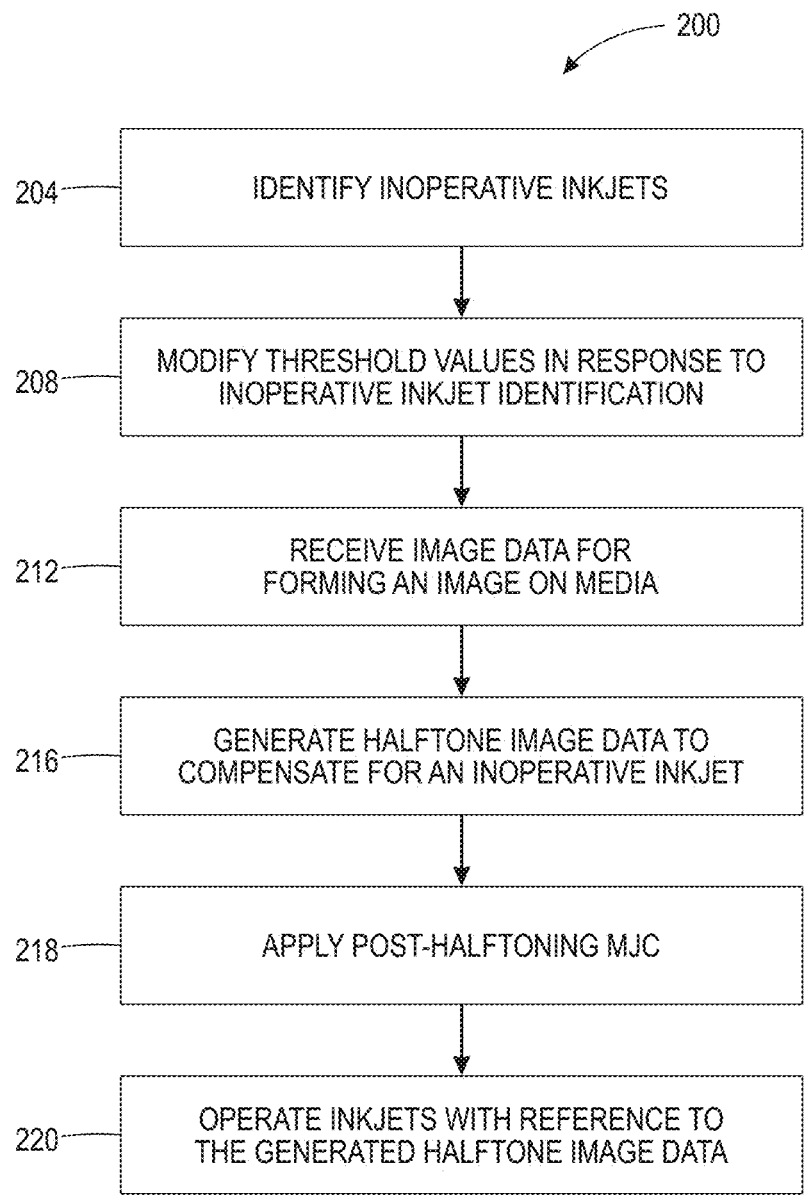

FIG. 1A and FIG. 1B illustrate flow diagrams of two similar exemplary embodiments to compensate for output density lost due to inoperative inkjets. Embodiments 100 and 200 represent embodiments of methods disclosed in this document that are applied in an imaging system using conventional scalar point-process threshold array halftoning to binary image data where each output color plane is halftoned independently with reference to a halftone threshold array. MJC embodiment 100 of FIG. 1A applies to image rendering systems using conventional point-process threshold array halftoning that do not also implement missing jet compensation (MJC) as a post-halftoning process on the halftoned bitmap. FIG. 1B represents a second of four embodiments of the current invention described herein. MJC embodiment 200 of FIG. 1B applies to image rendering systems using conventional point-process threshold array halftoning that also implement a post-halftoning missing jet compensation (MJC) process on the halftoned bitmap.

More specifically, embodiment 100 of FIG. 1A and embodiment 200 of FIG. 1B both begin with the identification of one or more inoperative inkjets (blocks 104 in FIG. 1A and 204 in FIG. 1B). This identification is followed by halftone threshold value modification in response to detected inoperative jets to pre-compensate for output density loss in threshold array columns used to halftone rasters associated with inoperative jets and their neighbors (blocks 108 of FIG. 1A and 208 of FIG. 1B). Embodiments 100 and 200 continue with the processor receiving image data to form an image on a media (blocks 112 and 212) and halftoning the received image data to generate halftoned image data with reference to the modified halftone threshold pattern (blocks 116 and 216). After block 216 embodiment 200 applies post-halftoning MJC (FIG. 1B block 218). Post-halftoning MJC is not applied in embodiment 100 of FIG. 1A. If compensation was successful (as determined by previously know MJC success assessment), then embodiments 100 and 200 each conclude by operating inkjets in the printhead with reference to the generated halftoned image data to print the modified page (blocks 120 and 220 in FIG. 1B). If compensation fails, the page may be processed as done in previously known systems.

Multiple ways are available to implement the threshold matrix value modification block 108 of FIG. 1A and 208 of FIG. 1B to achieve per-raster bias targets represented in FIG. 3A for MJC embodiments 100 and 200. A useful feature of these implementations pre-constructs the halftone pattern modifications for inclusion in the product just as default halftone patterns or default color transforms are. Even if threshold array modification are done in the printer, since threshold values are independent of image data, the threshold array can be modified for MJC during printer idle time before receiving data to print so this computation does not affect print time. Because halftone modification has little or no effect on print time, computationally expensive or non-real-time halftone pattern modification procedures, including iterative, manually tuned, and measurement based embodiments, may be used. Two relatively simple pattern modification embodiments that can produce good results within the printer are: threshold value exchange and threshold value scaling, which are described in this document.

Threshold matrix values can be modified to hide a missing output column by exchanging threshold values below maximum correctable density in "Missing" threshold columns corresponding to missing output rasters with threshold values above maximum density in nearby working "Neighbor" raster columns. This value swapping method can be applied to either MJC embodiment 100 or 200. To achieve the tone response depicted in FIG. 3B, embodiment 200 must leave some threshold values below maximum density in the missing raster column(s). Alternatively, threshold value modifications achieving the tone response depicted in FIG. 3A may also be used with embodiment 200.

Threshold values in missing raster aligned column swaths may also be modified by numerically scaling or biasing values by predetermined per-column bias functions matching the exemplary bias curves depicted in FIG. 3A and FIG. 3B. As illustrated in FIG. 3A, scaling threshold column values generally increase threshold values in swath columns used to halftone missing rasters to values greater than the maximum correctable level with corresponding decreases in swath "Neighbor" columns corresponding to non-missing rasters marked by operative inkjets. As noted above, in this simplified description, tone response is assumed linear and uniform for all rasters so the scaling (bias) functions composed with original threshold values equal the curves depicted in FIG. 3A and FIG. 3B. As described earlier, curves in FIG. 3A correspond to method 100 in FIG. 1A and FIG. 3B curves correspond to embodiment 200 in FIG. 1B. Threshold value modifications are described in more detail below.

Modified threshold values apply density and texture corrections to compensate for reduced output density and halftone pattern disruption in the final image caused by inoperative inkjets. As explained below, MJC embodiment 200 can take better advantage of post-halftoning processing when threshold column values in missing raster swaths are biased as illustrated in FIG. 3B. "Missing" and "Neighbor" target curves with threshold values modified leave some image data representing values between zero and the maximum correctable level in missing raster columns to be halftoned then repositioned, typically to adjacent rasters corresponding to operative inkjets, using known or simplified post-halftoning MJC methods. In other embodiments, numeric scaling and threshold value exchange methods can be combined or other threshold modification methods not described are used or used in combination with the described methods. In practice, since both the halftone pattern and tone responses bias targets are independent of image data and fixed for each output color and mode, combinations of threshold array column and bias curve can be pre-computed and verified at the factory then cached in the output device. If a threshold modification method like threshold value scaling where modifications are independent by column is used, pre-biased and cached threshold data can consist of as few as one cached threshold array per non-identity RasterType defined for the MJC method used (i.e.: "Missing" and "Neighbor" RasterType bias curves in FIG. 3A for embodiment 100 and in FIG. 3B for embodiment 200). Each RasterType associated cached threshold matrix could consist of the threshold matrix with all values pre-biased according to the bias curve corresponding to the associated RasterType. If missing raster swaths do not overlap in the threshold matrix, these cached pre-biased threshold array columns allow blocks 108 and 208 to generate the current biased threshold array simply by assembling it from pre-biased threshold columns according to, for example, the raster column indexed RasterType Array modulo threshold array width for the output color channel. Factory pre-computation enables use of more computationally expensive or time-consuming modification methods, which depending on output device characteristics can provide improved results.

Figure 2:
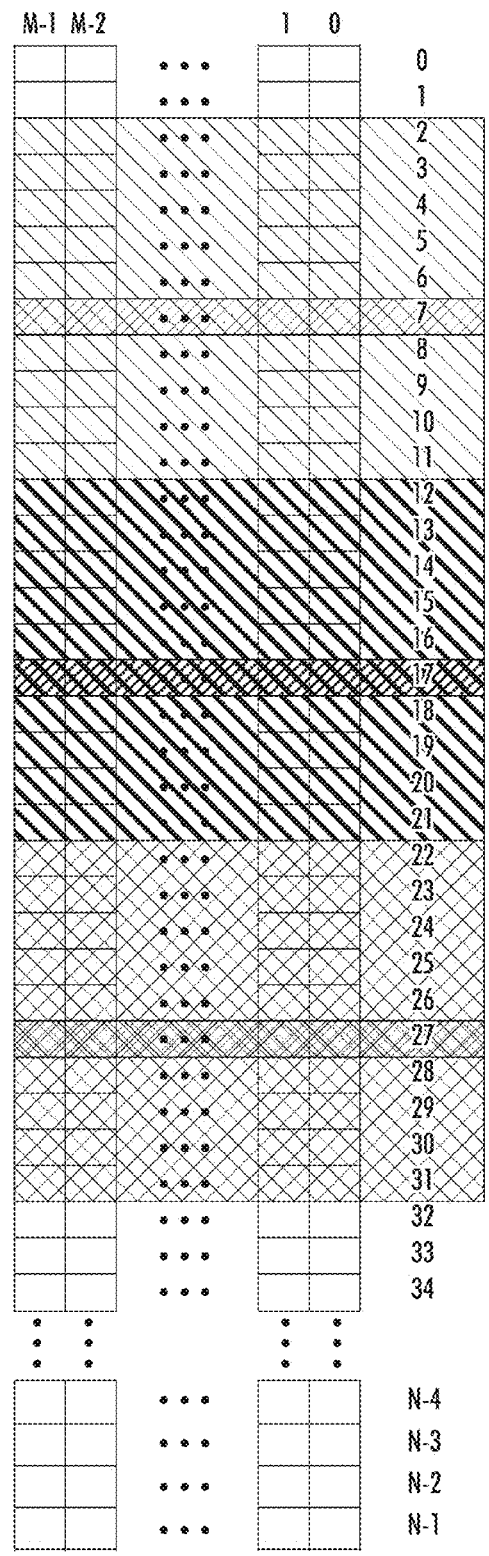

FIG. 2 depicts an exemplary N-column by M-row threshold matrix identifying columns of threshold values that can be modified to correct for a single exemplary malfunctioning inkjet. The column order of the matrix depicted in FIG. 2 is reversed with respect to the matrices depicted in FIG. 6 to FIG. 11 and FIG. 15 to FIG. 18, but the numbering of the columns remains the same. Rows and columns in the threshold matrix wrap so column 0 is adjacent to column N−1 and row 0 is adjacent to row M−1.

In this and other examples herein, threshold values in columns 7, 17, and 27 are used to halftone three missing raster columns corresponding to an inoperative inkjet. Since a ten-jet interlace is used, a maximum of nine working columns are available before encountering the next raster for which the inoperative jet is responsible. Thus, assuming uniform input color and no overlapping swaths compensating for other inoperative inkjets, a theoretical maximum correctable fractional coverage is bounded at 90%. Nine of ten columns are available in each ten-column swath to compensate for each missing raster column. In this example, all threshold array columns from column 2 to column 31 can be modified to compensate for the inoperative inkjet. Missing jet compensation generally reduces ink in missing rasters 7, 17, and 27 and increase ink in the other 27 nearby working columns to conserve overall density.

An important consequence of applying MJC processing occurs through conventional threshold array halftoning using threshold value modification is the unnecessary but unavoidable modification of other working raster swaths across the page. This modification occurs because the threshold array is tiled to fill the page. Assuming threshold array width N is less than page width, raster modifications correcting for an inoperative jet are applied every N columns across the output page. For input levels in the correctable range of no ink to maximum correctable density (about level 0 to 90% in FIG. 3A, FIG. 3B and FIG. 5), missing raster correction applied to working raster swaths produces the same acceptable output produced if the modified swath had included a missing raster. Matching output densities in modified and unmodified raster swaths are also produced for input levels greater than maximum correctable density (greater than about 90% in FIG. 3A, FIG. 3B and FIG. 5), because in this range the raster depopulated as missing in levels below the maximum correctable level is populated to provide the necessary output density increase for the swath. The "Missing" raster population increases from about 0 to 100% in FIG. 3A corresponding to MJC example 100 and about 10 to 100% in FIG. 3B corresponding to MJC example 200. This use of the "Missing" raster for levels greater than maximum correctable output is also reflected in FIG. 5.

The curves in FIG. 3A and FIG. 3B represent threshold column tone response before and after threshold modifications to hide inoperative jets as outlined in embodiment 100 and 200 respectively. For simplicity, in this and other examples herein, threshold values are assumed to produce linear output density with respect to input image pixel values. Also for simplicity, only three RasterType indexed bias curves are used. The curve denoted "Unmodified" depicts an identity function leaving input values unchanged. This curve represents un-biased (un-modified) threshold column values. The other two curves represent bias functions applied to threshold array columns to compensate for inoperative inkjets. The curve denoted "Missing" in the figure represents tone level assignments applied to all values in threshold columns used to halftone rasters missing due to inoperative inkjets. These values are biased relative to the "Unmodified" curve to substantially depopulate missing rasters up to a maximum correctable input level. Conversely, the curve identified as "Neighbor," represents average tone level biases applied to threshold values in nine image raster columns nearest each "Missing" raster column. These "Neighbor" threshold columns, used to halftone working rasters near the missing raster, are biased to conserve overall missing raster centered swath density. "Neighbor" threshold column values are biased to greater than "Unmodified" values for input levels less than the maximum correctable input level such that at maximum input level these columns are at or near 100% level coverage. Above this maximum correctable input level to 100% input, average "Neighbor" values increase little or not at all. In this range, tone level assignment values in "Missing" threshold columns increase from minimal to 100% output for 100% input as described above.

FIG. 3A represents a mode of operating a printer without accommodation for a complementary post-halftoning malfunctioning jet compensation (MJC) process. FIG. 3B represents a different mode of operating the printer designed to apply both pre and post-halftoning MJC processing. Unlike the process of FIG. 3A, the "Missing" curve in FIG. 3B is populated for all input levels retaining reduced responsibility for density contribution from input level 0 to the maximum correctable level with the assumption that post-halftoning binary MJC successfully repositions residual ink in the "Missing" column produced by the process. As in FIG. 3A, FIG. 3B curves associated with operative jet columns modified to hide inoperative jets are denoted "Neighbor" and threshold columns for inoperative jets are denoted "Missing."

The halftoned data for rasters associated with operative inkjets in the modified swath are populated at lighter than normal levels so the swath is fully populated at an input level lighter than 100% of the maximum input value. For the example depicted in the figures, this lighter, fully populated input level is about 90% of the fractional coverage boundary noted above. As illustrated in FIGS. 3A and 3B, from input level 0 to 90%, the raster corresponding to the inoperative inkjet is sparsely populated. From about 90% to 100% maximum input level, all additional ink in the swath is added to the raster corresponding to the inoperative inkjet since all of the neighboring columns are used. Thus, input levels greater than the theoretical maximum correctible fractional coverage level are represented by image data left in the raster corresponding to the inoperative inkjet. That is, assuming uniform input image data, the threshold value modification and halftoning scheme can achieve printed output density within each swath no greater than a theoretical maximum level limited by the number of working columns in the swath divided by total columns in the swath. In the example illustrated in FIGS. 3A, 3B, 13A and 13B, the theoretical maximum correctable level is 90% of the maximum image data value. In practice, output texture, differential gloss, transition smoothness, color mixing behavior, printer to printer variation, and other printer model specific factors tend to reduce the real limit to something less than the theoretical limit. Also, multiple inoperative jets of the same output color positioned so that associated missing raster swaths overlap, reduce the theoretical maximum correctable level in the vicinity of the overlap. How this overlap condition is handled can depend on output device characteristics. However, good results can be achieved with little change to missing raster swath processing described herein. Good results are provided simply by superimposing modifications to neighbor raster columns and skipping over missing rasters from other than the current missing raster swath. This superimposition effectively widens missing raster swaths by one column for each additional missing raster in the swath. If missing raster swaths are modified serially relative to one another, modifications superimpose naturally with no change to raster modification. In some embodiments, additional RasterType designations or the like are required to process overlapping missing raster swaths.

The following describes two methods to modify threshold array values in a halftone pattern prior to scalar threshold array halftoning to compensate for inoperative jets. Each of these examples implements only one modification method. In practice, these methods and others may be combined and controlled according to level and swath column as needed to best meet product specific requirements. The following two methods modify each missing raster centered swath in the threshold array independently unless multiple missing rasters share a swath. Before threshold array modifications begin, the missing jet list, jet to raster and raster to threshold column mapping are consulted to identify all threshold columns aligned with missing rasters, then each missing column and surrounding swath is processed.

If a "Neighbor" column in the current swath corresponds to a missing column, the column is skipped and the next working column nearest the swath takes its place as a member of the swath. Processing that was to apply to the missing column skipped is instead applied to the next nearest working column replacing it. Each skipped column increases the actual raster width of the swath by one. Since skipped non-target missing columns are eventually processed within their own swaths and neighbor column biases can be superimposed, in many embodiments no other recognition of the overlap or special threshold array processing is necessary.

FIG. 6 and FIG. 7 represent the unmodified threshold matrix, FIG. 8 and FIG. 9 modify FIG. 6 using discrete threshold value swapping, and FIG. 10 and FIG. 11 are modified with column scaling. FIG. 6, FIG. 8, and FIG. 10 are plots representing the first 35 columns and 18 rows of a threshold matrix as described by FIG. 3B. Like FIG. 3B, columns 7, 17, and 27 represent rasters corresponding to inoperative inkjets. FIG. 7, FIG. 9, and FIG. 11 represent halftoned binary bitmap output produced by applying the corresponding threshold values to halftone an exemplary seventy percent uniform gray input image.

In more detail, FIG. 6 depicts a representation of an unmodified stochastic halftone threshold matrix aligned with columns 0 to 34 in FIG. 2. FIG. 7 represents an exemplary binary result of halftoning a uniform 70% gray image using the threshold matrix of FIG. 6. Each binary data location in the halftone map is marked with the threshold value from the matrix of FIG. 6 used to determine the binary value for the location. FIG. 8 depicts a plot representing the threshold values in the threshold matrix modified using a threshold value swapping method to reposition ink for correctable levels away from the rasters corresponding to inoperative inkjets, while preserving image values in the raster having high-density uncorrectable levels. In FIG. 8, columns 7, 17, and 27 represent modified threshold values for columns corresponding to an inoperative inkjet. FIG. 9 depicts a portion of a binary image halftoned from a uniform seventy percent gray contone input image using the threshold values modified with reference to the rasters of columns 7, 17, and 27 that correspond to the same inoperative inkjet. This simplified implementation of threshold value swapping can use an eighty-one candidate (nine neighbor columns by nine rows) priority search list and the threshold matrix described in FIG. 2. The threshold value exchange method can be described as:

```
for each missing raster aligned swath in a threshold matrix
    for each level from lightest to darkest
        for each missingColumnPixelLocation in the
            missing threshold column
            for each candidatePixelLocation in the prioritySearchList
                if candidate Value is not in a missing raster column
                    if candidate Value is > level
                        swap threshold values missingColumnValue with
                            candidate Value in threshold matrix
```

For correctable levels (levels less than the maximum correctable level), this method can reposition ink away from rasters corresponding to the inoperative inkjet, while reserving image data in the rasters for high-density uncorrectable levels. To accommodate printer requirements and control optional post-halftoning MJC processing, candidates for swapping can be weighted and restricted according to factors including input level and relative column location in the swath. After swapping, threshold values can also be scaled to compensate for dot gain differences induced by halftone pattern changes.

As noted above, the threshold values in the threshold value matrix can be modified with column specific scaling to induce modified curve shape differences as depicted in FIG. 3A and FIG. 3B. This threshold column value scaling can be implemented with, for example, predetermined per-column tone response curves stored in look up tables or pre-biased threshold array data adjusted (rolled right or left) to line up with missing rasters to achieve the required swath density profile. FIG. 10 is a plot representing FIG. 6 threshold values modified using threshold column scaling to reposition ink for correctable levels away from the rasters corresponding to the inoperative inkjets in the swaths, while preserving image data in the rasters for high-density uncorrectable levels. As noted previously, the threshold values in columns 7, 17, and 27 of the threshold matrix shown in FIG. 10 are used to halftone the rasters corresponding to the inoperative inkjets in the respective swaths. The threshold Column Tone Levels in FIG. 10 are modified for ninety percent maximum correctable level. FIG. 11 is a portion of a binary image halftoned from a uniform seventy percent gray contone input image using the scaled threshold values in FIG. 10. This threshold modification alters the halftone pattern while conserving the image values in the rasters corresponding to the inoperative inkjets that are uncorrectable. This column scaling can minimize changes to the halftone pattern and take advantage of contone values to apply tone scale adjustment by threshold column. This approach enables replacement of computationally expensive post-halftoning orphan diffusion, edge detection and dot-overlap compensation with simple orphaned pixel displacement to adjacent rasters without sacrificing performance and quality improvements.

The constant value MAXIMUM_THRESH can be the maximum threshold value, e.g.: 256 or $2^{14}$, and threshIn and threshOut can be initial and modified threshold values. An exemplary method of calculating threshOut values can be described as:

For all Threshold Values in the Missing Raster Aligned Column threshIn:

threshOut=(MAXIMUM_THRESH*0.9)+
(threshIn*0.1);

For all threshold values in 9 neighboring columns in the swath threshIn:

threshOut=threshIn*0.9;

MJC methods that modify threshold values in a threshold value matrix provide a number of advantages over previously known MJC methods applied to halftoned data. Low spatial frequency corrections can be computationally expensive when applied to halftoned data because low spatial frequency corrections can require a large modifiable context, edge-detection, and overlap compensation. The LUT column scaling approach to the threshold values can provide the same functionality without these constraints. Modifying threshold values can enable redistribution of ink to be ejected by inoperative inkjets over a relatively large field and scale density according to the halftone pattern. These factors help eliminate random read/write access to image data, printer resolution threshold data, gray balance and linearization. Threshold value modification methods can also improve flexibility because they can be implemented in software without adversely impacting print throughput and can be modified more easily than hardware. Additionally, the threshold modifying MJC compensation methods are compatible with most existing hardware and software based MJC methods applied to halftoned data. For example, moving density and halftone texture correction out of post-halftoning data processing and into the halftoning process can eliminate the need for most post-halftoning neighborhood processing. If threshold value modifications work well, the only post-halftoning bitmap modification processing that may be needed is simple Boolean operations between the missing raster and adjacent rasters to reposition missing raster pixels to available locations in adjacent rasters for an operative inkjet. Halftoning MJC methods also eliminate the need to buffer more than two or three rasters or to detect, keep track of or modify anything in the larger binary neighborhood processed by post-halftoning methods. Halftoning MJC allows post-halftoning MJC processing, if required, to be simple enough for software implementation without losing performance. When halftoning-based MJC is used, at most post-halftoning MJC is only responsible for limited residual image data displacement and MJC success evaluation.

FIG. 12A and FIG. 12B illustrate flow diagrams of two additional exemplary embodiments to compensate for inoperative inkjets during halftoning using vector point-process halftoning (VHT). The vector halftone process depicted in FIG. 14C halftones image data with reference to a 14-bit valued common threshold array depicted here scaled to eight-bits for comparison to other exemplary embodiments herein. Both embodiments compensate for output density lost due to inoperative inkjets. Specifically the embodiment of FIG. 12A (embodiment 1300) applies to image rendering systems using vector point-process halftoning that do not also implement missing jet compensation (MJC) as a post-halftoning process on the halftoned bitmap. FIG. 12B represents another similar embodiment of the current invention described herein. Specifically the method of FIG. 12B applies to image rendering systems using vector point-process halftoning (VHT) that also implement missing jet compensation (MJC) as a post-halftoning process on the halftoned bitmap.

Embodiment 1300 in FIG. 12A and 1400 in FIG. 12B begin their respective processing in blocks 1304 and 1404 by identifying inoperative inkjets. This identification is followed in blocks 1308 and 1408 by activities to prepare for receipt of image data. These activities may include generating or updating RasterType array values (FIG. 14B) and generating or updating biased TRC LUTs (FIG. 14A). RasterType Array values are generated or updated using the missing jet lists (block 1605) and output mode specific jet-to-raster mappings (block 1603) as depicted in FIG. 14B with RasterType Arrays for each output mode consisting of one array of RasterType values per output color, each including at least one RasterType value per output column. To improve VHT performance pre-biased TRC LUTs may also be generated or updated as illustrated in FIG. 14A. For each output device TRC, typically one per output color per output mode, one pre-biased LUT per non-identity RasterType is generated. At this point pre-computation is complete. Nothing more need be done until either the inoperative inkjet list changes or image data is received.

Activity resumes when image data for forming an image on output media is received, blocks 1312 and 1412. The printer responds to input image data by vector halftoning each pixel of the input page according to the method of FIG. 14C with reference to per-raster RasterType array values (1607), TRC LUTs (1505), biased TRC LUTs (1507) and the threshold value array to generate halftoned image data including compensation for inoperative inkjets, blocks 1316 and 1416. When halftoning is complete, method 1400 block 1418 of FIG. 12B applies post-halftoning MJC to the halftoned data. This post-halftoning MJC is not applied in FIG. 12A. Application of post-halftoning MJC is the difference between embodiment 1300 and 1400. The method concludes in blocks 1320 of FIG. 12A and 1420 of FIG. 12B, with the processor operating the inkjets within the printhead in the inkjet printer with reference to the halftoned (block 1320) or halftoned and post-processed (block 1420) image data.

Vector halftone processing is implemented using a single threshold matrix for all color planes. For each input color, vector halftoning partitions threshold matrix values into possible output colors. The smallest threshold values in the matrix correspond to the darkest colorant combinations and higher threshold values correspond to lighter colorant combinations. Partitioning is determined through extensive "color mix value" calculations. The reader should understand, however, that the modifications discussed herein could be applied to any point-process vector halftone based halftoning system.

To implement MJC in the exemplary VHT system depicted in FIG. 14C, the look-up-tables used to apply per-output channel tone response linearization and convert image data from 8-bit data to 14-bit data (block 1701) can also be used to bias image data in missing raster swaths. This conversion can compensate for reduced density including low spatial frequency bands and other artifacts caused by the missing raster. This biasing is used to map image data values above the maximum correctable level to rasters corresponding to inoperative inkjets. Additionally, all rasters in the swath corresponding to operative inkjets can compensate for density loss from the raster corresponding to the inoperative inkjet with fractionally increased density for input levels below the maximum correctable level.

FIG. 13A illustrates three tone level bias curves indexed by RasterType. In the embodiment depicted in FIG. 14C, RasterType values "Missing" and "Neighbor" index corresponding bias functions that are applied to rasters in missing raster swaths per-raster according to RasterType. This application to rasters in swaths, each of which contains a missing raster and corresponds to inoperative inkjets and neighboring columns, hides the absence of ink due to missing rasters. In this embodiment, the RasterType "Unmodified" depicted as an identity function represents an average tone scale for all rasters outside of missing raster swaths and inside swaths prior to modification. As illustrated in FIG. 13A and FIG. 13B, curves labeled with RasterTypes "Neighbor" and "Missing" represent tone levels for bias adjusted rasters in missing raster swaths relative to the unbiased "Unmodified" identity curve. "Missing" is the tone level curve shape of an adjusted raster corresponding to an inoperative inkjet and "Neighbor" represents average tone level for the nine columns in the swath corresponding to operative inkjets. In this example, image data in the swath for operative inkjets are populated at lighter than normal levels, so the swath is fully populated at an input level lighter than 100% of the maximum image data value. In this example, this lighter, fully populated input level is about 90% fractional coverage of this maximum value. As illustrated in FIG. 13A, from white to 90%, the raster corresponding to the inoperative inkjet has been populated very little or not at all. For image data values in the raster for the inoperative inkjet that are in the range of about 90% to 100% coverage of the maximum value, all ink added to the swath is added to the missing raster corresponding to the inoperative inkjet once the "Neighbor" columns are 100% used or reserved for post-halftone MJC processing. In some embodiments, rasters closer to the raster corresponding to the inoperative inkjet might be configured to provide more ink with rasters closest to the inoperative inkjet providing little or no ink to accommodate residual ink repositioned by post-halftoning processing. In one embodiment, one or more additional RasterTypes along with corresponding biased TRC curves can be used. The definitions of these additional RasterTypes distinguish these "Neighbor" rasters from others in the swath in which a raster for an inoperative inkjet is located and biased TRC curves are required for this distinction.

Again, the application of the curves shown in FIG. 13B provide an output density contribution over ten adjacent rasters with one raster corresponding to an inoperative inkjet as shown in FIG. 5 with reference to the exemplary graph of an unmodified (default) output density contribution over ten adjacent rasters shown in FIG. 5. Again, the rasters n1 to n9 in FIG. 5 correspond to operative inkjets and raster m represents a raster missing due to an inoperative inkjet. In this diagram, curves for rasters n1 to n9 are shown each with the same contribution to output density but, as long as the required total distribution is met, each raster's contribution may be different. To support different contributions from different "Neighbor" columns within a swath, additional RasterType designations are required. These designations are in addition to the minimal set of three: "Missing", "Neighbor" and "Unmodified" described for the simple exemplary embodiments herein. These additional designations could be used to partition rasters with the designation "Neighbor" used herein into two or more distinct RasterTypes, each with its own pre-computed bias curve set and designated position within a swath. For example, the single RasterType "Neighbor" used herein could be replaced and partitioned into two RasterType designations, for example "Near" and "Far." Each would require a set of bias curves, at least one for each ink color, output mode, and missing raster swath configuration in which they are used. The bias curves associated with each RasterType included in the missing raster swath can vary as needed as long as the total density contribution from working rasters in the swath is sufficient to compensate for density lost in the missing raster. In other words, with reference to FIG. 4 and FIG. 5 and input levels from 0 to about 90%, as long as the total density from nine bias curve modified working rasters in a ten raster swath match the total density contribution from ten working rasters in a similar unmodified ten raster swath over the same input level range, rasters of different RasterTypes may be defined and used as needed.

Each additional RasterType category requires its own set of pre-computed bias curves and pre-determined relative positions within the missing raster swath. Like the simple three RasterType examples used herein, additional RasterTypes indexing different pre-computed bias curves RasterTypes designed to contribute differently to pre-determined placement within the swath must conserve RasterType designations within missing raster swaths to conserve overall missing raster swath density for the ink color channel and print mode where they are used.

FIG. 14C illustrates an exemplary vector halftone system 1700. In one embodiment, the vector halftone system 1700 can include two memory blocks. In one example, the first memory block can accommodate the TRC values that are different for different VHT print modes. Rather than writing 1024 14-bit values at the start of a job, the values can be directly accessed from memory using DMA techniques to obtain two 14-bit values per 32-bit Dword, which is right aligned in each 16-bit word. The reader should understand that Dword means a double word, which refers to 32-bit values while a word is 16 bits in size. In one example, the TRC data can be cache-line aligned for good DMA service. In another example, the second memory block, the halftone threshold array may not fit entirely in the memory on the FPGA. Since the array can apply to the image in a simple grid, one row from the array can service an entire raster. The threshold array is accessed via DMA circuitry in one row at a time of SCREEN_CELL_WIDTH entries, the transfer taking place for line n+1 while line n is processed. When the entire array has been transferred, (a multiple of SCREEN_CELL_HEIGHT lines) the DMA wraps back around to the first row in the array. All rows should be cache-line aligned though the cell width can be any value in the acceptable range.

With further reference to the embodiment shown in FIG. 14C, input to the vector halftone system 1700 is 8-bit CMYK video data and output of the TRC mapping component 1701 is 14-bit binary CMYK video data. The inputs and outputs illustrated in FIG. 14C can be variable names or programmable parameters or memory. Exemplary variable data in the vector halftone system 1700 can include RasterType Arrays. In one embodiment, RasterType Arrays can be arrays of RasterType values, one array for each ink color indexed by raster position. In the RasterType Arrays, one entry per-raster column can indicate the MJC raster type into which the current raster falls. These data, based on pre-determined swath widths and implementation specific swath raster types, can be updated at start-up and whenever the list of inoperative inkjets changes (FIG. 12A block 1308 and FIG. 12B block 1408). Another exemplary variable data in the vector halftone system 1700 can include "Missing" TRC data. "Missing" TRC data can include predetermined 1-D TRC look up tables for C, M, Y, and K respectively that enable component 1701 to convert 8-bit to 14-bit CMYK data (C14, M14, Y14, and K14) on a channel-by-channel basis. These TRC LUTs can apply color channel and raster column specific linearization to input image data. These tables can be computed by applying TRC Missing bias curves, which are depicted in FIG. 14C, to TRC LUT mode specific linearization data. Another exemplary variable data in the vector halftone system 1700 can include "Neighbor" TRCs. In one example, "Neighbor" TRCs data can include predetermined 1-D TRC look up tables for C, M, Y and K respectively that enable component 1701 to convert 8-bit to 14-bit CMYK data (C14, M14, Y14, and K14) on a channel-by-channel basis. These TRC LUTs can apply color channel and raster column specific linearization to input data. These tables can be computed by applying TRC bias curves, which are depicted in FIG. 14C, to TRC LUT mode specific linearization data. In one example, multiple "Neighbor" TRC table sets can be required. In another example, one set for each RasterType can be used.

With further reference to FIG. 14C, vector halftoning can process input video on a pixel-by-pixel basis. An exemplary VHT algorithm detail is described herein with further reference to FIG. 14A, FIG. 14B and FIG. 14C. In one embodiment, before halftoning, at start-up and when the list of inoperative inkjets is modified, RasterType Arrays 1600 and TRCs 1500 for each ink color and swath RasterType can be computed. In another example, assuming color linearization is complete and subsequent VHT processing blocks, other than Under Color Generation component 1707, do not change or at least do not exceed input cyan 14 bit, magenta 14 bit, yellow 14 bit and black 14 bit color levels before thresholding and printing, continuous-tone MJC processing can be done as part of TRC block 1701. In one embodiment, vector halftoning is applied to each pixel in the continuous tone input stream in the vector halftone system 1700.

In the embodiment shown in FIG. 14C with reference to FIG. 14A and FIG. 14B, the 8-bit CMYK data is converted to 14-bit data (C14, M14, Y14, and K14) on a channel-by-channel basis by TRC component 1701 by applying predetermined TRC look-up-tables that include 1-D LUTs for C, M, Y, and K, respectively 1507. The TRC look up tables 1507 can apply color channel and raster column specific linearization to input data. The "TRC" component 1701 can also conditionally apply continuous-tone MJC correction to image data in rasters corresponding to inoperative inkjets within swaths using RasterType 1607 specific pre-biased TRCs 1507. The TRC Look up tables (LUTS) 1507 are generated or updated using the tone bias curves (such as the missing, neighbor, or the like) 1503 and the TRC Look up tables 1505, as depicted in FIG. 14A.

With further reference to FIG. 14A, FIG. 14B, and FIG. 14C, the current image data being processed can be located in a swath having a raster corresponding to an inoperative inkjet. If the current raster's RasterType in the RasterType Array 1607 is "Missing," for example, if RasterType=="Missing," then the "Missing" TRC can be used. In another example, if the current raster is "Neighbor," for example if RasterType=="Neighbor," then the "Neighbor" TRC can be used. In another embodiment, with reference to FIG. 14A, RasterType specific 8-bit to 14-bit look up tables can be pre-computed from the original 8 to 14-bit TRC LUT and RasterType specific bias curves as depicted in FIG. 13B. In one example, several types of "Neighbor" curves, each associated with a set of correspondingly biased TRC LUT can be used if more column relative position specific bias settings are required for the columns corresponding to inoperative inkjets.

With further reference to FIG. 14C, pixel output from "Tone Scale Adjust" component 1701 are represented as CMYK 14-bits per channel, if the pixel is part of one or more missing raster swaths, its value in each missing raster swath channel has been scaled to fit target TRC curves as depicted in FIG. 13A or FIG. 13B. Subsequent component blocks operating on these pixels before the "Vector Thresholding" component 1709 preserve these biased level relationships. These components include "Max Level Definition" 1703, "Vector Color Calculation" 1705, and "Under Color Generation" 1707. An embodiment can check the RasterType of the current pixel in each of the four RasterType Arrays, one for each output color. If the current pixel is missing from any of the four output ink colors, the embodiment disables black generation and under color generation by selecting the appropriate implementation specific MarkingType to disable these functions. Depending on the device, the CompositeBlack variable may need to be set to FALSE.

In FIG. 14C, the "Max Level Definition" component 1703 includes "Through Hole" and "Composite K" functions. In one example, the max level (maxcov in the code example herein) for CMYK can be defined by MarkingType, CompositeBlack, MaxLevelHole and MaxLevel parameters. An exemplary implementation of the max level can include:

maxcmyk=max(max(($C_{14}$, $M_{14}$), max(($K_{14}$, $Y_{14}$));
    limit_photo=1;
    if(maxcmyk>MaxLevelHole)
        limit_photo=0;
    maxlvlcmy=MaxLevel;
    if (MarkingType==11)
        maxlvlcmy=MaxLevel−$K_{14}$;

In one embodiment, the "Through Hole" function can be required for MarkingType=10 and 14. An exemplary implementation of the "Through Hole" function can include:

else if ((MarkingType==10)\\(MarkingType==14))
    {
        if(limit_photo)
            maxlvlcmy=MaxLevelHole−$K_{14}$;
        else
            maxlvlcmy=maxcmyk−$K_{14}$;
    }
    else
    {

In one embodiment, the "Composite K" function can be controlled by the CompositeBlack parameter.

if (compositeBlack)
    {
        mincmy=min ($C_{14}$, min($M_{14}$, $Y_{14}$));
        if (mincmy !=0)
        {
            maxcmy=max ($C_{14}$, max ($M_{14}$, $Y_{14}$));
            temp=mincmy*mincmy/maxcmy;
            $C_{14}$−=temp;
            $M_{14}$−=temp;
            $Y_{14}$−=temp;
            $K_{14}$+=temp;
            if ($K_{14}$>MaxLevel)$K_{14}$=MaxLevel;
        }
    }
    maxlvlcmy=MaxLevel−$K_{14}$;
    }
    if($C_{14}$>maxlvlcmy) $C_{14}$=maxlvlcmy;
    if($M_{14}$>maxlvlcmy) $M_{14}$=maxlvlcmy;
    if($Y_{14}$>maxlvlcmy) $Y_{14}$=maxlvlcmy;
    if ((markingType !=10) && (markingType !=14))
    { maxcov=MaxLevel;
}
else
{
  if(limit_photo)
  {
    maxcov=MaxLevelHole;
  }
  else
  {
    maxcov=maxcmyk;
  }
}

In FIG. 14C, the "Vector Color Calculation" component 1705 calculates the seven vector colors ($C\_$, $M\_$, $Y\_$, $K\_$, $R\_$, $G\_$, $B\_$) based on the input fourteen bit values for the cyan, magenta, yellow and black colors in the BlackGeneration variable raster swath. An exemplary implementation may redefine maxlvlcmy to ensure that maxlvlcmy is not greater than maxcov, which can happen when the "Through Hole" function is applied.

if(maxlvlcmy>maxcov) maxlvlcmy=maxcov
$C_{14}+M_{14}+Y_{14}+K_{14}$<=maxcov case:
  $C\_=C_{14}$, $M\_=M_{14}$, $Y\_=Y_{14}$, $K\_=K_{14}$,
  $R\_=G\_=B\_=0$;
$C_{14}+M_{14}+Y_{14}+K_{14}$>maxcov case:
  There are total six cases for further calculation. We just show one case ($C_{14}$>=$M_{14}$>=$Y_{14}$) as an example. In this case, secondary color is blue.
  maxc=$C_{14}$;
  midc=$M_{14}$;
  minc=$Y_{14}$;
  kLB=max(0, ((maxc+(minc<<1)−maxlvlcmy)>>1));
  kUB=min(minc, ((minc+midc+maxc−maxlvlcmy)>>1));
  k0=kLB+(((kUB−kLB)*BlackGeneration)>>4);
  t=maxlvlcmy−minc+k0;
  maxc2=t−midc;
  midc2=t−maxc;
  minc2=minc−k0;
  RGB_=maxc+midc−k0−t;
  K=$K_{14}$+k0;
  $C\_$=maxc2;
  $M\_$=midc2;
  Y=minc2;
  $R\_=G\_=0$;
  $B\_$=RGB;

The "Under Color Generation" component 1707 in FIG. 14C converts $K\_$ color into other vector colors ($KC\_$, $KM\_$, $KY\_$, $KR\_$, $KG\_$, $KB\_$) based on the MarkingType variable. If $K\_$ is greater than zero and the current pixel is missing K, "Under Color" has already been depopulated for levels below the maximum correctable level so little or no C, M, or Y "Under Color" ink would be generated by this component. Alternatively, if C, M, or Y are missing and $K\_$ is non-zero generated, "Under Color" would populate a missing raster either causing subsequent MJC success evaluation to fail or causing under color tinted to be away from the missing ink color. In either case embodiments can use MarkingType settings to bypass or modify the behavior of this block. In one known embodiment, three conversions with fixed weights are used. The three conversions are:

(1) Equally weighted single-layer under color for MarkingType=3, 6, 10 or 11.
  $KC\_=(K\_*43)>>7$;
  $KM\_=KC\_$;
  $KY\_=K\_-KC\_-KM\_$;
  $KR\_=KG\_=KB\_=K\_=0$;

(2) Non-equally weighted single-layer under color for MarkingType=5 or 8.
  $KC\_=(K\_*13)>>5$;
  $KM\_=(K\_*13)>>6$;
  $KY\_=K\_-KC\_-KM\_$;
  $KR\_=KG\_=KB\_=K\_=0$;

(3) Non-equally weighted 2-layer under color for MarkingType=4 or 9.
  $KB\_=(K\_*13)>>5$;
  $KR\_=(K\_*13)>>6$;
  $KG\_=K\_-KB\_-KR\_$;
  $KC\_=KM\_=KY\_=K\_=0$;

For other MarkingTypes not mentioned above, this block is bypassed.

The "Vector Thresholding" component 1709 in FIG. 14C performs vector thresholding on the completed 15 channel 14-bit per channel input color vector for the current input pixel based on the Threshold Pattern parameter to produce a 4 channel (CMYK) 1-bit result. An exemplary implementation of the vector thresholding can include:

if $KB\_>t$,
  print C, M, and K dots;
else if $KG\_+KB\_>t$,
  print C, Y, and K dots;
else if $KC\_+KG\_+KB\_>t$,
  print C and K dots;
else if $KR+KC\_+KG\_+KB\_>t$,
  print M, Y and K dots;
else if $KM\_+KC+KR\_+KG+KB\_>t$,
  print M and K dots;
else if $KY\_+KM\_+KC+KR\_+KG+KB\_>t$,
  print Y and K dots;
else if $K\_+KY\_+KM\_+KC+KR\_+KG+KB\_>t$,
  print K dot;
else if $B\_+K\_+KY\_+KM\_+KC+KR\_+KG+KB\_>t$,
  print C and M dots;
else if $G\_+B\_+K\_+KY\_+KM\_+KC+KR\_+KG+KB\_>t$,
  print C and Y dots;
else if $C\_+G\_+B\_\_+K\_+KY\_+KM\_+KC+KR\_+KG+KB\_>t$,
  print C dot;
else if $R\_+C\_+G\_+B\_+K\_+KY\_+KM\_+KC+KR\_+KG+KB\_>t$,
  print M and Y dots;
else if $M\_+C\_+R\_+G\_+B\_+K\_+KY\_+KM\_+KC+KR\_+KG+KB\_>t$,
  print M dot;
else if $Y+M\_+C\_+R\_+G\_+B\_+K\_+KY\_+KM\_+KC+KR\_+KG+KB\_>t$,
  print Y dot where t is a threshold value from the Screen parameter for the current pixel location.

The "Post-Halftoning MJC" component 1711 in FIG. 14C is optional and may perform simplified or known binary domain missing jet compensation to reposition residual pixels marked in the missing raster to the nearest available raster column, usually in the same pixel row. Post-halftoning MJC processing may be followed by MJC success assessment according to previously known methods.

The methods disclosed herein may be implemented by a processor being configured with instructions and related circuitry to perform the methods. Additionally, processor instructions may be stored on computer readable medium so they may be accessed and executed by a computer to perform the methods compensating an inoperative inkjet. Accordingly, such instructions can be stored on computer readable media within the printer shown in FIG. 19 to configure one or more controllers in the printer to perform the methods described herein.

It will be appreciated that variants of the above disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of operating an imaging device comprising:
   identifying inoperative inkjets in the imaging device;
   modifying non-image data with reference to the identified inoperative inkjets;
   receiving continuous tone image data for forming an image with the imaging device;
   applying the modified non-image data to the received continuous tone image data to produce image data that compensates for the identified inoperative inkjets in the imaging device; and
   operating inkjets within the imaging device with reference to the image data that compensates for the identified inoperative inkjets.

2. The method of claim 1, the modification of the non-image data further comprising:
   modifying at least one threshold value in a plurality of threshold values that are used to generate halftone image data from the continuous tone image data, the at least one threshold value corresponding to at least one of the identified inoperative inkjets.

3. The method of claim 2, the modification of the at least one threshold value further comprising:
   increasing the at least one threshold value corresponding to the at least one of the identified inoperative inkjets.

4. The method of claim 2, the modification of the at least one threshold value further comprising:
   decreasing the at least one threshold value corresponding to the at least one of the identified inoperative inkjets.

5. The method of claim 2, the modification of the at least one threshold value further comprising:
   modifying the at least one threshold value corresponding to the at least one of the identified inoperative inkjets to enable image data corresponding to the at least one identified inoperative inkjet to be reserved for further processing after generating the halftone image data from the received continuous tone image data.

6. A method of operating an imaging device comprising:
   identifying inoperative inkjets in the imaging device;
   receiving continuous tone image data for forming an image with the imaging device;
   modifying non-image data with reference to the identified inoperative inkjets by modifying a data conversion parameter with reference to whether the data conversion parameter corresponds to an operative inkjet or an inoperative inkjet;
   applying the modified non-image data to the received continuous tone image data to produce image data that compensates for the identified inoperative inkjets in the imaging device by converting at least one image data value in the received continuous tone image data to a second image data value with the modified data conversion parameter; and
   operating inkjets within the imaging device with reference to the image data that compensates for the identified inoperative inkjets.

7. The method of claim 6, the conversion of the at least one image data value further comprising:
   increasing a number of bits representing the at least one image data value.

8. The method of claim 6, the modification of the data conversion parameter further comprising:
   modifying tonal reproduction curve (TRC) data with reference to whether the TRC data is to be applied to image data corresponding to an operative inkjet or an inoperative inkjet.

9. An imaging device comprising:
   a memory in which continuous tone image data for forming an image on media are stored;
   a plurality of inkjets configured to elect drops of a marking material to form an image on the media; and
   a controller operatively connected to the memory and the plurality of inkjets, the controller being configured to:
   identify inoperative inkjets in the plurality of inkjets;
   modify non-image data with reference to the identified inoperative inkjets;
   apply the modified non-image data to the continuous tone image data to produce image data that compensates for the identified inoperative inkjets in the plurality of inkjets; and
   operate inkjets in the plurality of inkjets with reference to the image data that compensates for the identified inoperative inkjets.

10. The imaging device of claim 9, the controller being further configured to modify non-image data by:
    modifying threshold values used to generate halftone image data from the continuous tone image data.

11. The imaging device of claim 10, the controller being further configured to modify the threshold values by:
    increasing at least one of the threshold values corresponding to at least one of the identified inoperative inkjets.

12. The imaging device of claim 10, the controller being further configured to modify at least one threshold value by:
    decreasing at least one of the threshold values corresponding to at least one of the identified inoperative inkjets.

13. The imaging device of claim 10, the controller being further configured to modify at least one threshold value by:
    modifying the at least one threshold value to enable image data corresponding to the inoperative inkjet to be reserved for further processing after the halftone image data is generated from the continuous tone image data.

14. An imaging device comprising:
    a memory in which continuous tone image data for forming an image on media are stored;
    a plurality of inkjets configured to elect drops of a marking material to form an image on the media; and
    a controller operatively connected to the memory and the plurality of inkjets, the controller being configured to:
    identify inoperative inkjets in the plurality of inkjets;
    modify non-image data with reference to the identified inoperative inkjets by modifying a data conversion parameter with reference to whether the data conversion parameter corresponds to an operative inkjet or an inoperative inkjet;
    apply the modified non-image data to the continuous tone image data to produce image data that compensates for the identified inoperative inkjets in the imaging device by converting at least one continuous tone image data value in the stored continuous tone image data to a second image data value with the modified data conversion parameter; and operate the plurality of inkjets with reference to the image data that compensates for the identified inoperative inkjets.

15. The imaging device of claim 14, the controller is further configured to convert the at least one continuous tone image data value by:
increasing a number of bits representing the at least one continuous tone image data value.

16. The imaging device of claim 14, the controller is further configured to modify the data conversion parameter by:
modifying tonal reproduction curve (TRC) data with reference to whether the TRC data is to be applied to continuous tone image data corresponding to an operative inkjet or an inoperative inkjet.

* * * * *